United States Patent
Umanesan

(10) Patent No.: US 9,130,969 B2
(45) Date of Patent: Sep. 8, 2015

(54) DATA STORAGE I/O COMMUNICATION METHOD AND APPARATUS

(75) Inventor: Ganesan Umanesan, Guildford (GB)

(73) Assignee: Seagate Technology LLC, Cupertino, CA (US)

( * ) Notice: Subject to any disclaimer, the term of this patent is extended or adjusted under 35 U.S.C. 154(b) by 257 days.

(21) Appl. No.: 13/593,327

(22) Filed: Aug. 23, 2012

(65) Prior Publication Data

US 2014/0059551 A1   Feb. 27, 2014

(51) Int. Cl.
- *G06F 9/46* (2006.01)
- *H04L 29/08* (2006.01)
- *G06F 3/06* (2006.01)

(52) U.S. Cl.
CPC .......... *H04L 67/1097* (2013.01); *H04L 67/322* (2013.01); *H04L 67/325* (2013.01); *G06F 3/0659* (2013.01)

(58) Field of Classification Search
None
See application file for complete search history.

(56) References Cited

U.S. PATENT DOCUMENTS

| | | | |
|---|---|---|---|
| 6,189,022 B1 * | 2/2001 | Binns | 718/100 |
| 6,657,987 B1 | 12/2003 | Kumar et al. | |
| 6,909,691 B1 | 6/2005 | Goyal et al. | |
| 7,917,903 B2 | 3/2011 | Lumb et al. | |
| 2002/0078121 A1 * | 6/2002 | Ballantyne | 709/102 |
| 2004/0260748 A1 | 12/2004 | Springer et al. | |
| 2005/0157752 A1 * | 7/2005 | Takase et al. | 370/468 |
| 2007/0064711 A1 | 3/2007 | Wang et al. | |

OTHER PUBLICATIONS

Eun-Chan Park et al., "Adaptive Token Bucket Algorithm for Fair Bandwidth Allocation in DiffServ Networks," School of Electrical Engineering and Computer Science, Seoul National University, Seoul, Korea, pp. 1-5 (undated).

Matthew Wachs et al., "Argon: performance insulation for shared storage servers," 5th USENIX Conference on File and Storage Technologies (FAST '07), San Jose, California, 16 pages (Feb. 13-16, 2007).

Han Seok Kim et al., "A Token-Bucket Based Rate Control Algorithm with Maximum and Minimum Rate Constraints," IEICE Trans, Commun., vol. E91-B, No. 5, pp. 1623-1626 (May 2008).

Search Report dated Jul. 17, 2013 from GB Application No. GB1223503.2, 1 page.

* cited by examiner

*Primary Examiner* — Sisley Kim
(74) *Attorney, Agent, or Firm* — Hollingsworth Davis, LLC

(57) ABSTRACT

A method of scheduling requests from various services to a data storage resource, includes receiving service requests, the service requests including metadata specifying a service ID and a data size of payload data associated with the request, at least some of the service IDs having service throughput metadata specifying a required service throughput associated therewith; arranging the requests into FIFO throttled queues based on the service ID; setting a deadline for processing of a request in a throttled queue, the deadline selected in dependence upon the size of the request and the required service throughput associated therewith; providing a time credit value for each throttled queue, the time credit value including an accumulated value of the time by which a deadline for that queue has been missed; comparing the time credit value of a throttled queue to the time required to service the next request in that throttled queue.

24 Claims, 20 Drawing Sheets

DATA STORAGE I/O COMMUNICATION METHOD AND APPARATUS

The present invention relates to a method of, and apparatus for, scheduling requests for data communication from a client-side service to a service station. More particularly, the present invention relates to scheduling requests for data communication from a client-side service to a service station to enable provision of a guaranteed data rate for communication.

Traditionally, electronic data is stored locally on a user's computer system by means of a data storage resource such as a hard disk drive (HDD) or other storage media. However, the increasing prevalence of data-heavy resources (for example, real-time high definition video) has led to an increased demand for storage capacity.

An increasingly popular area is what is known as "cloud computing". Cloud computing provides a set of scalable and often virtual resources over a network such as an Ethernet or the Internet. A "cloud" comprises a consolidated storage system having large storage capacity (typically at the multi-petabyte level) which may serve independent customers (e.g. the cloud acts a storage service provider) or business units within an organisation (e.g. the cloud acts as a common corporate data store). In essence, cloud architecture means that the users generally do not own the physical computing resources they use and, instead, purchase usage from a third-party provider in a service-orientated architecture, or access a common corporate data store.

Cloud-type storage service providers are attractive to small to medium sized enterprises which do not typically have the resources to invest in over-provisioned storage infrastructures which will never be used efficiently. In addition, cloud-type services enable a user having multiple devices (e.g. smartphones, tablets, laptops and workstations) to access common stored data without the need to synchronise the data between the individual devices.

Storage service providers offer such users access to the storage services that they require without the need for capital expenditure on hardware and software solutions. In addition, the cost of hardware is becoming increasingly small in comparison to the cost of maintaining and managing a data storage resource. Therefore, this makes the cloud approach even more attractive to businesses. In many cases, service providers provide services in the manner of a utility service and billed, for example, on the basis of the storage resources (e.g. storage space) consumed by the user or on a periodical billing basis.

It is known for the provision of services by a service provider to be covered by service level agreements (SLAs). An SLA is a negotiated agreement between a service provider (or target) offering a service and a client (or initiator) requiring use of the service. The SLA records a common agreement regarding the quality of service (QoS) to be delivered to the client. For example, in the field of data storage provision, the QoS may relate to a particular level of storage capacity or reliability which can be guaranteed by the service provider.

Increasingly, users of a storage resource may wish to access bandwidth-intensive media such as streaming video data. In this regard, a minimum bandwidth is required to provide smooth playback of the streamed video. If the minimum bandwidth is not met or maintained by the storage resource, then there may be pauses in the video playback whilst the required data is obtained from the storage resource. This leads to an unsatisfactory user experience. As a result, some users of a storage resource may prefer to specify a minimum guaranteed bandwidth in addition to a guaranteed volume of storage space.

However, to date, it has been difficult to guarantee bandwidth in known storage resource arrangements. This is because the performance of a given data storage resource is heavily dependent upon the demands placed upon it. If a number of users are using a large proportion of bandwidth of the data storage resource, then the service provider may not be able to meet the particular bandwidth requirements specified by each user. Given the non-deterministic nature of storage resource access, this means that, currently, it is not possible to provide an assurance of a given bandwidth when the data is accessed.

Typically, the only way to circumvent this problem is to heavily over-provision the data storage resource, i.e. to have sufficient spare capacity to ensure that the specified bandwidth requirements are met. However, this approach is wasteful of resources and uneconomical because a significant proportion of the bandwidth available to the data storage resource must be kept free for use during abnormally heavy traffic conditions, and so is rarely used. Consequently, existing service-orientated storage providers can only guard against "worst case" scenarios of abnormally heavy load.

This issue can be mitigated by providing a "throttled" service. A throttled service is one which is bandwidth limited, as opposed to an "unthrottled" service which has no such bandwidth restriction and would, in the absence of competing data transfers, in principle consume all of the bandwidth available. Throttling of user's services may assist in preventing some users from consuming an unfair proportion of the available bandwidth. However, throttling in a general sense merely provides an upper limit on the bandwidth and cannot provide a minimum lower limit which is required in order to guarantee smooth transmission of, for example, video data as discussed above.

Therefore, known storage provision arrangements suffer from a technical problem that bandwidth requirements cannot be efficiently and accurately guaranteed. This means that real-time guarantees on storage resource bandwidth cannot be made without over-provisioning of the storage resource.

In addition, some arrangements suffer from the technical problem that bandwidth cannot be throttled to a high degree of granularity at high bandwidths. The reason for this is the scheduler's clock resolution. In other words, the clock resolution is not arbitrarily high for supporting all throughput ranges on that system. In most computer systems, such as modern Linux machines, a practical clock resolution for the dispatcher would be 10 ms. However, since the dispatcher itself is another computer program running on a storage server along with many other programs there is no guarantee that dispatcher's clock would provide exactly 10 ms resolution.

To illustrate the problem, suppose a dispatcher is provided with a perfect clock having 1 ms resolution. Also, suppose that each service request has exactly 1 MB size. Then the table below shows the throughput throttle values achievable under this scenario:

| | Delay (ms) | | | | | | | | | |
|---|---|---|---|---|---|---|---|---|---|---|
| | 1 | 2 | 3 | 4 | 5 | 6 | 7 | 8 | 9 | 10 |
| Throughput (MB/s) | 1000 | 500 | 333 | 250 | 200 | 166 | 142 | 125 | 111 | 100 |

Clearly, for example, setting 1 ms delay gives us 1000 MB/s throughput and 2 ms gives 500 MB/s throughput but 800 MB/s cannot definitely be guaranteed even though we have a perfect clock and constant service weight for all service requests. This illustrates that the problem cannot be solved by tuning hardware/software clock frequency or other properties such as Lustre filesystem properties.

In reality the problem is further compounded by the fact that service request data sizes are not always constant. Some parallel filesystems such as Lustre mostly operate with 1 MB size but there is no guarantee it will always remain 1 MB.

"Argon:performance insulation for shared storage servers" Wachs et al., 5$^{th}$ Usenix conference on file and storage technologies (FAST '07) and U.S. Pat. No. 7,917,903 relate to scheduling methods to enable a particular quality of service to be provided. However, these arrangement are unsuitable for parallel distributed file systems in which data is stored over a number of service systems, such as may be found in a cloud-type system.

According to a first aspect of the present invention, there is provided a method of scheduling requests from a plurality of services to at least one data storage resource, the method comprising:

a) receiving, on a computer system, service requests from said plurality of services, the service requests comprising metadata specifying a service ID and a data size of payload data associated with said service request, at least some of said service IDs having service throughput metadata specifying a required service throughput associated therewith;

b) arranging, in a computer system, said requests into FIFO throttled queues based on said service ID;

c) setting, on a computer system, a deadline for processing of a request in a throttled queue, the deadline being selected in dependence upon the size of the request and the required service throughput associated therewith;

d) providing, on a computer system, a time credit value for each throttled queue, the time credit value comprising an accumulated value of the time by which one or more deadlines for that queue has been missed;

e) comparing, on a computer system, the time credit value of a throttled queue to the time required to service the next request in that throttled queue;

f) if, in step e), it is determined that the time credit in said throttled queue is sufficient, processing said request in a data storage resource, decrementing the time credit value for said queue by an amount equal to the time required to service said request and returning to step e) above; or g) if, in step e), it is determined that the time credit is insufficient, monitoring, on a computer system, the deadline for processing of a request in said throttled queue;

h) if, in step g), it is determined that the request in the throttled queue has reached or exceeded the deadline, processing said request in a data storage resource, incrementing the time credit value for said queue by an amount equal to the time by which the deadline for servicing said request was missed, and returning to step c) above.

In one embodiment, the time credit value for the or each queue has a maximum allowable value.

In one embodiment, said maximum allowable value is 100 ms.

In one embodiment, the time required to service the next request in the queue is determined from the data size of the request and the required throughput for that queue.

In one embodiment, step f) comprises:

i) processing said request in a data storage resource and determining the remainder for the time credit difference corresponding to an amount equal to the time required to service said request, and decrementing the time credit value for said queue by an amount equal to the time required to service said request only if said remainder is equal to zero.

In one embodiment, if, in step i) said remainder is non-zero, returning to step e) without decrementing the time credit value.

In one embodiment, step i) involves determining the remainder for the time credit difference corresponding to an amount equal to the time required to service one or more requests, and decrementing the time credit value for said queue by an amount equal to the time required to service said requests only if said remainder is equal to zero.

In one embodiment, if, in step g), it is determined that the deadline for processing of a request in said throttled queue has not yet expired, the method further comprises the step of:

j) moving to the next throttled queue in line and carrying out steps e) to h) as required for that queue.

In one embodiment, each service request is arranged into a queue selected from the group of: throttled queue, gracefully throttled queue and unthrottled queue.

In one embodiment, in step b) service requests having a service ID to which no service throughput metadata is associated, or service requests having no service ID, are arranged into at least one FIFO unthrottled queue.

In one embodiment, if, at step g), no request in a throttled queue has reached or exceeded a deadline, the method further comprises:

k) monitoring said unthrottled queues and, if at least one request is present in an unthrottled queue:

l) processing said unthrottled request in an unthrottled queue; and m) returning to the throttled queues and repeating step e).

In one embodiment, in step b) service requests having a service ID to which service throughput metadata and gracefully throttled identifier metadata is associated are arranged into at least one FIFO gracefully throttled queue.

In one embodiment, said throttled queues are arranged in priority order, with the monitoring in step d) starting with the highest priority queue.

In one embodiment, a plurality of data storage resources are provided and step c) further comprises setting and selecting the deadline for the n$^{th}$ request having a particular service ID in dependence upon the sum of the data sizes of the first to the n$^{th}$ requests having said particular service ID and the required service throughput associated with said particular service ID.

In one embodiment, each request having a particular service ID has the same data size and said deadline for the n$^{th}$ request having a particular service ID is set in dependence upon the request number n and the known weight of each request.

In one embodiment, each request from a particular service ID comprises a distance parameter x associated therewith relating to the sum of the data sizes of the first to the $n^{th}$ requests from said particular service ID.

In one embodiment, step c) comprises setting, on a service station, a new deadline for a request based on the distance parameter x of said request and the service throughput metadata associated therewith.

In one embodiment, at least one service is distributed across a plurality of locations such that each service ID is associated with a plurality of location IDs.

In one embodiment, each service request comprises a service ID and a location ID.

In one embodiment, a plurality of parallel data storage resources is provided.

According to a second aspect of the present invention, there is provided a method of scheduling requests from a plurality of services to at least one data storage resource, the method comprising:
a) receiving, on a computer system, service requests from said plurality of services, the service requests comprising metadata specifying a service ID and a data size of payload data associated with said service request, at least some of said service IDs having service throughput metadata specifying a required service throughput associated therewith;
b) arranging, in a computer system, said requests into FIFO throttled queues based on said service ID;
c) setting, on a computer system, a deadline for processing of a request in a throttled queue, the deadline being selected in dependence upon the size of the request and the required service throughput associated therewith;
d) providing, on a computer system, a service weight credit value for each throttled queue, the service weight credit value comprising an accumulated value of the size of requests which have been serviced since the last deadline was set;
e) if said deadline set in step c) has expired:
f) processing said next request in a data storage resource; and
g) incrementing said service weight credit value by an amount equal to the service weight of said processed request;
h) determining, on a computer system, whether at least one criterion of said service weight credit value is met and, if so, setting a new deadline for processing of a request in a throttled queue and returning to step e); or
i) if said at least one criterion is not met, returning to step f).

In one embodiment, whether said at least one criterion is met comprises determining whether a maximum value of the service weight credit value has been exceeded or determining whether the service weight credit value exceeds a minimum value and has no remainder value.

In one embodiment, said maximum value is determined by: determining a delay corresponding to the service weight credit value and; determining whether said delay exceeds a maximum delay.

In one embodiment, the maximum delay is 100 ms.

In one embodiment, said minimum value is determined by: determining a delay corresponding to the service weight credit value and; determining whether said delay exceeds a minimum delay.

In one embodiment, said minimum delay is 10 ms.

According to a third aspect of the present invention, there is provided a request scheduler operable to schedule requests from a plurality of services to at least one data storage resource, the request scheduler being operable:
a) to receive service requests from said plurality of services, the service requests comprising metadata specifying a service ID and a data size of payload data associated with said service request, at least some of said service IDs having service throughput metadata specifying a required service throughput associated therewith;
b) to arrange said requests into FIFO throttled queues based on said service ID;
c) to set a deadline for processing of a request in a throttled queue, the deadline being selected in dependence upon the size of the request and the required service throughput associated therewith;
d) to provide a time credit value for each throttled queue, the time credit value comprising an accumulated value of the time by which one or more deadlines for that queue has been missed;
e) to compare the time credit value of a throttled queue to the time required to service the next request in that throttled queue;
f) if, in step e), it is determined that the time credit in said throttled queue is sufficient, to process said request in a data storage resource, to decrement the time credit value for said queue by an amount equal to the time required to service said request to return to step e) above; or
g) if, in step e), it is determined that the time credit is insufficient, to monitor the deadline for processing of a request in said throttled queue;
h) if, in step g), it is determined that the request in the throttled queue has reached or exceeded the deadline, to process said request in a data storage resource, incrementing the time credit value for said queue by an amount equal to the time by which the deadline for servicing said request was missed, and to return to step c) above.

According to a fourth aspect of the present invention, there is provided a request scheduler operable to schedule requests from a plurality of services to at least one data storage resource, the request scheduler being operable:
a) to receive service requests from said plurality of services, the service requests comprising metadata specifying a service ID and a data size of payload data associated with said service request, at least some of said service IDs having service throughput metadata specifying a required service throughput associated therewith;
b) to arrange said requests into FIFO throttled queues based on said service ID;
c) to set a deadline for processing of a request in a throttled queue, the deadline being selected in dependence upon the size of the request and the required service throughput associated therewith;
d) to provide a service weight credit value for each throttled queue, the service weight credit value comprising an accumulated value of the size of requests which have been serviced since the last deadline was set;
e) if said deadline set in step c) has expired:
f) to process said next request in a data storage resource; and
g) to increment said service weight credit value by an amount equal to the service weight of said processed request;
h) to determine whether at least one criterion of said service weight credit value is met and, if so, to set a new deadline for processing of a request in a throttled queue and to return to step e); or
i) if said at least one criterion is not met, to return to step f).

In embodiments, there is provided a method of scheduling requests from a plurality of services to at least one data storage resource, the method comprising:
a) receiving, on a computer system, service requests from said plurality of services, the service requests comprising metadata specifying a service ID and a data size of payload data associated with said service request, at least some of said service IDs having service throughput metadata specifying a required service throughput associated therewith;

b) arranging, in a computer system, said requests into FIFO throttled queues based on said service ID;

c) setting, on a computer system, an initial deadline for processing of a request in a throttled queue, the deadline being selected in dependence upon the size of the request and the required service throughput associated therewith;

d) providing, on a computer system, a time credit value for each throttled queue, the time credit value comprising an accumulated value of the time by which one or more deadlines for that queue has been missed;

e) comparing, on a computer system, the time credit value of each throttled queue to the time required to service the next request in that throttled queue;

f) if, in step e), it is determined that the time credit is sufficient, processing said request in a data storage resource, decrementing the time credit value for said queue by an amount equal to the time required to service said request and repeating step e) above; or g) if, in step e), it is determined that the time credit is insufficient, incrementing the time credit value for said queue by an amount equal to the time by which a deadline for servicing said request was missed;

h) setting, on a computer system, a deadline for processing of a request in a throttled queue, the deadline being selected in dependence upon the size of the request and the required service throughput associated therewith;

i) repeating step e) above.

In one embodiment, each service request is arranged into a queue selected from the group of: throttled queue, gracefully throttled queue and unthrottled queue.

In one embodiment, in step b) service requests having a service ID to which no service throughput metadata is associated, or service requests having no service ID, are arranged into at least one FIFO unthrottled queue.

In one embodiment, if, at step d), no request in a throttled queue has reached or exceeded a deadline, the method further comprises: f) monitoring said unthrottled queues and, if at least one request is present in an unthrottled queue: g) processing said unthrottled request in an unthrottled queue; and h) repeating step d).

In one embodiment, in step b) service requests having a service ID to which service throughput metadata and a gracefully throttled metadata identifier is associated are arranged into at least one FIFO gracefully throttled queue.

In one embodiment, if, at step d), no request in a throttled queue has reached or exceeded a deadline, the method further comprises: i) monitoring said gracefully throttled queues and, if at least one request is present in a gracefully throttled queue: j) processing said gracefully throttled request in a gracefully throttled queue; and k) repeating step d).

In one embodiment, wherein if, at step d), no request in a throttled queue has reached or exceeded a deadline, the method further comprises: l) monitoring said gracefully throttled queues and unthrottled queues and, if at least one request is present in a gracefully throttled or an unthrottled queue: m) processing said gracefully throttled or unthrottled request in a gracefully throttled or unthrottled queue; and n) repeating step d).

In one embodiment, said gracefully throttled queues have priority over said unthrottled queues.

In one embodiment, said unthrottled queues have priority over said gracefully throttled queues.

In one embodiment, said gracefully throttled queues and said unthrottled queues have equal priority.

In one embodiment, said throttled queues are arranged in priority order, with the monitoring in step d) starting with the highest priority queue.

In one embodiment, said service throughput metadata is supplied to the computer system independently of the service requests.

In one embodiment, a plurality of data storage resources are provided and step c) further comprises setting and selecting the deadline for the $n^{th}$ request having a particular service ID in dependence upon the sum of the data sizes of the first to the $n^{th}$ requests having said particular service ID and the required service throughput associated with said particular service ID.

In one embodiment, each request having a particular service ID has the same data size and said deadline for the $n^{th}$ request having a particular service ID is set in dependence upon the request number n and the known weight of each request.

In one embodiment, each request from a particular service ID comprises a distance parameter x associated therewith relating to the sum of the data sizes of the first to the $n^{th}$ requests from said particular service ID.

In one embodiment, step c) comprises setting, on a service station, a new deadline for a request based on the distance parameter x of said request and the service throughput metadata associated therewith.

In one embodiment, the request comprises said service throughput metadata.

In one embodiment, said request comprises service throughput metadata combined with said distance parameter x to provide deadline data to said computer system.

In one embodiment, in step c) the computer system determines the deadline for a request from said distance parameter x of a request and service throughput metadata received independently by said computing system.

In one embodiment, step c) further comprises: setting a new deadline for the next request in dependence upon the distance parameter x of the next request, the distance parameter of the previously-processed request processed in step e) and the service throughput metadata.

In one embodiment, at least one service is distributed across a plurality of locations such that each service ID is associated with a plurality of location IDs.

In one embodiment, each service request comprises a service ID and a location ID.

In one embodiment, step c) further comprises setting and selecting the deadline for the $n^{th}$ request having a particular service ID and location ID in dependence upon the sum of the data sizes of the first to the $n^{th}$ requests having said particular service ID and location ID and the required service throughput associated with said particular service ID.

In one embodiment, each request has a distance parameter x associated therewith, said request number n corresponding to the $n^{th}$ request having a particular service ID and location ID, and said distance parameter comprising the sum of the data sizes of the first to the $n^{th}$ requests having said location ID.

In one embodiment, step g) further comprises: setting a new deadline for the next request in dependence upon the distance parameter x of the next request having a particular location ID, the distance parameter of the previously-processed request having said location ID processed in step c) and the service throughput metadata.

In one embodiment, a plurality of parallel data storage resources is provided.

In embodiments, there is provided a method of scheduling requests from a plurality of services to at least one data storage resource, the method comprising: a) receiving, on a computer system, service requests from said plurality of services, the service requests comprising metadata specifying a service ID and a data size of payload data associated with said service request, at least some of said service IDs having service throughput metadata specifying a required service throughput associated therewith; b) arranging, in a computer system, said requests into FIFO throttled queues based on said service ID; c) setting, on a computer system, a deadline for processing of a request in a throttled queue, the deadline being selected in dependence upon the size of the request and the required service throughput associated therewith; d) providing, on a computer system, a service weight credit value for each throttled queue, the service weight credit value comprising an accumulated value of the size of requests for which deadlines for servicing of said requests has been missed; e) if said deadline has expired: f) processing said request in a data storage resource; and g) incrementing said service weight credit value by an amount equal to the service weight of said processed request; h) if said service weight credit value exceeds a maximum value or if the service weight credit value exceeds a minimum value and has no remainder value, setting, on a computer system, a new deadline for processing of a request in a throttled queue and repeating step e); or i) if neither of the above criteria are met, processing the next request in said queue and repeating step h).

According to a fifth aspect of the present invention, there is provided a non-transitory computer usable storage medium having a computer program product stored thereon executable by a programmable processing apparatus and comprising one or more software portions for performing the steps of the first and second aspects.

According to a sixth aspect of the present invention, there is provided an electronic data store comprising a data storage resource and the request scheduler of the third or fourth aspect.

Embodiments of the present invention will now be described in detail with reference to the accompanying drawings, in which.

Figure 1:
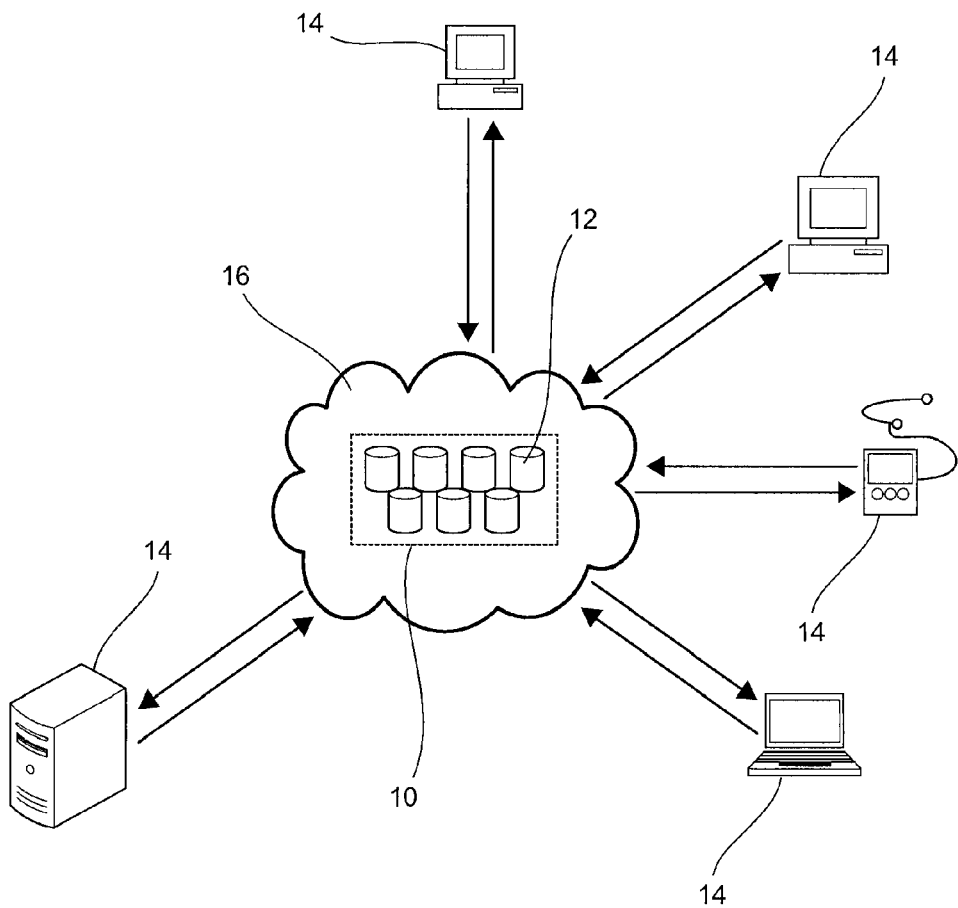
FIG. 1 is a schematic diagram of a cloud network.

FIG. 1 shows a schematic illustration of an electronic data store 10 provided by a service provider. The data store 10 comprises a plurality of storage units 12. Each storage unit 12 may take the form of, for example, an individual hard drive or a collection of hard disk drives (HDDs) linked together through a protocol such as Redundant Array of Inexpensive Disks (RAID) to form a logical unit. However, irrespective of the number or configuration of HDDs present, the data store 10 is presented to the service origins 14-$i$ as a single logical drive.

A plurality of service origins 14 connect to the data store 10 through a cloud network 16. The service origins 14 may take any suitable form. For example, they may comprise workstations, mobile telephones (such as, for example, so-called "smartphones"), laptop computers, tablet computers, servers or other computing equipment. In the context of the described embodiments, the clients may take the form of one or more programs (for example, a web browser system) running on a computer hardware system. Additionally, the service origins 14 may comprise client programs which form part of a parallel file system, distributed file system or other distributed network services.

The cloud network 16 may take a number of forms, for example, an internet network, a cable network or a mobile network. The cloud network 16 enables each user of each client 14 to read data from, or write data to, the data store 10 as if the data was stored locally. Each client computer 14 has an SLA with the service provider of the data store 10 which specifies the QoS required by the user of the client computer 14 whilst connected to the data store 10. For example, the SLA might specify the type of data access required (e.g. random or sequential) and/or the bandwidth/latency requirements of the access required to, or the retrieval required from, the data store 10.

Figure 2:
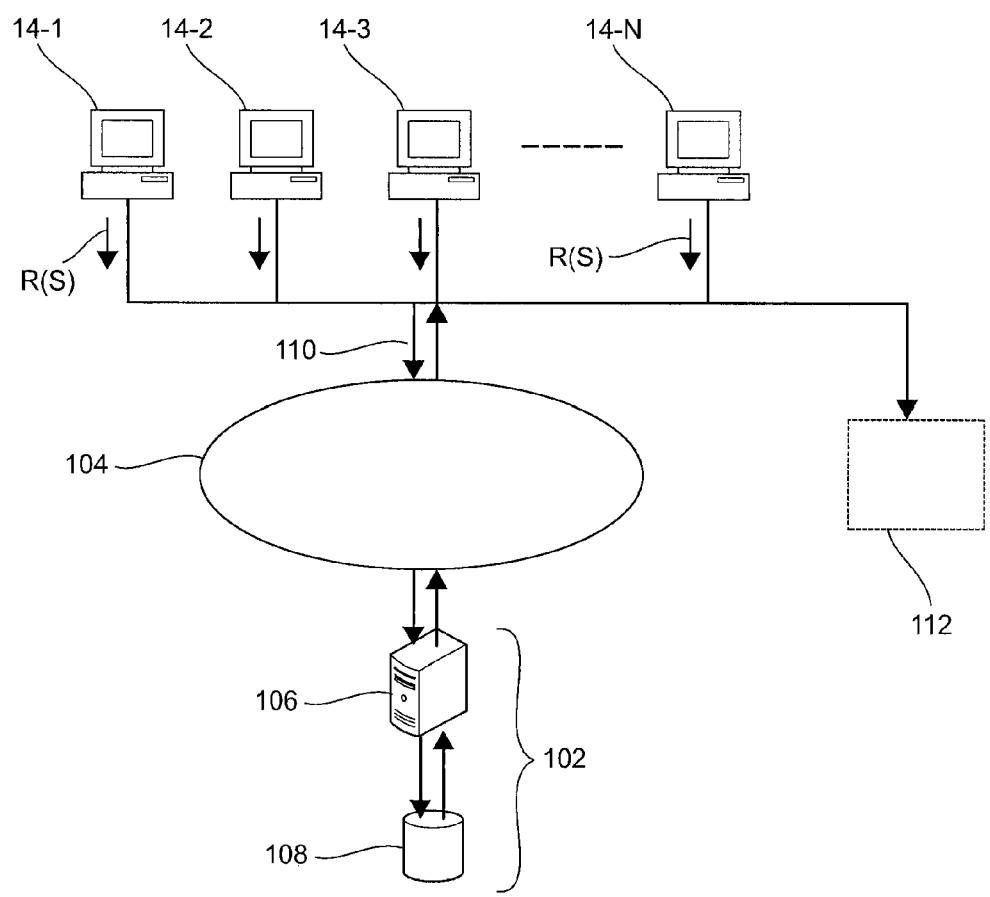
FIG. 2 is a schematic diagram of an embodiment of an electronic data store comprising a single service station.

FIG. 2 shows a first embodiment of an electronic data store 100. The electronic data store 100 comprises a service station 102 and a request scheduler 104. In this example, the service station 102 comprises a server 106 and at least one data storage component 108. In an example, the data storage component 108 may comprise a group of approximately five to eight physical drives linked together in a RAID arrangement.

RAID architecture combines a multiplicity of small, inexpensive disk drives into an array of disk drives that yields performance that can exceed that of a single large drive. This arrangement enables high speed access because different parts of a file can be read from different devices simultaneously, improving access speed and bandwidth.

Data interleaving in a RAID arrangement is usually in the form of data "striping" in which the data to be stored is broken down into blocks called "stripe units". The "stripe units" are then distributed across the physical drives. Therefore, should one of the physical drives in a group forming a storage component 108 fail or become corrupted, the missing data can be recreated from the data on the other drives. The data may be reconstructed through the use of the redundant "stripe units" stored on the remaining physical drives using known RAID techniques such as XOR.

The physical drives may take any form of storage device, such as, for example, tape drives, disk drives, non-volatile memory, or solid state devices. Although most RAID architectures use hard disk drives as the main storage devices, it will be clear to the person skilled in the art that the embodiments described herein apply to any type of suitable storage device. Further, a physical drive may take the form of a single partition on a hard disk drive. Therefore, a single hard disk drive may comprise a plurality of physical drives in the context of the electronic data store 100.

In this embodiment, the data storage component comprises an Object-based Storage Device (OSD). An OSD is a computer storage device which operates at a higher level of abstraction than block-orientated interfaces. An OSD does not read and write fixed sized blocks of data as in a conventional file system structure. Instead, the OSD standard organizes data into variable-sized data packages known as objects. Each object is associated with data and metadata comprising an extensible set of attributes which describe the object.

However, the exact form and nature of the service station 102 is not material to the present invention. In the context of this application, the service station 102 is a single storage facility for data to which I/O requests can be communicated and to which data can be sent to, stored on, and retrieved from. The service station 102 may, in fact, comprise a number of different OSDs 108 connected together through a single server or through multiple servers. The skilled person would be readily aware of the different forms or structures that the service station 102 may take within the scope of the present invention.

The request scheduler 104 controls the flow of data into and out of the storage resource 102, and controls access to the service station 102 from client computers 14 through a network 110 using, for example, the TCP/IP protocol. The network 110 may comprise a local area network (LAN) or the Internet using existing network infrastructure.

The request scheduler 104 may take a number of forms; for example, the request scheduler 104 may take the form of a metadata server. Alternatively, the request scheduler 104 may take the form of a software or hardware interface run on the service station 102. The skilled person would be readily aware of the variations which fall within the scope of the present application.

The request scheduler 104 is operable to receive a plurality of service requests R from the service origins 14 and schedule the requests to provide a guaranteed service rate or service throughput i.e. a guaranteed rate of work done for groups of service requests across the entire distributed system where service requests with same Service IDs could originate at more than one Service Origins and reach more than one Service Stations for service completion. In general, the requests R comprise metadata identifying payload data (e.g. I/O read/writes) to be sent to the service stations from the service origins. By scheduling these requests, the flow of data to the service stations from the service origins can be scheduled and optimised to provide guarantees of bandwidth or other parameters as required.

The I/O requests R may be in any suitable format. For example, the I/O requests R may be in the OSD (Object storage Device) protocol. The OSD protocol uses a SCSI command set developed by the T10 committee of the International Committee for Information Technology Standards. In the OSD standard, objects are specified with a 64-bit partition ID and a 64-bit object ID. The command interface comprises storage commands to create and delete objects, to write bytes and read bytes to and from individual objects, and to "set" attributes on objects, and to "get" those attributes on objects. Alternatively, other formats for the requests R may be used, and these will be readily apparent to the skilled person.

Figure 3:
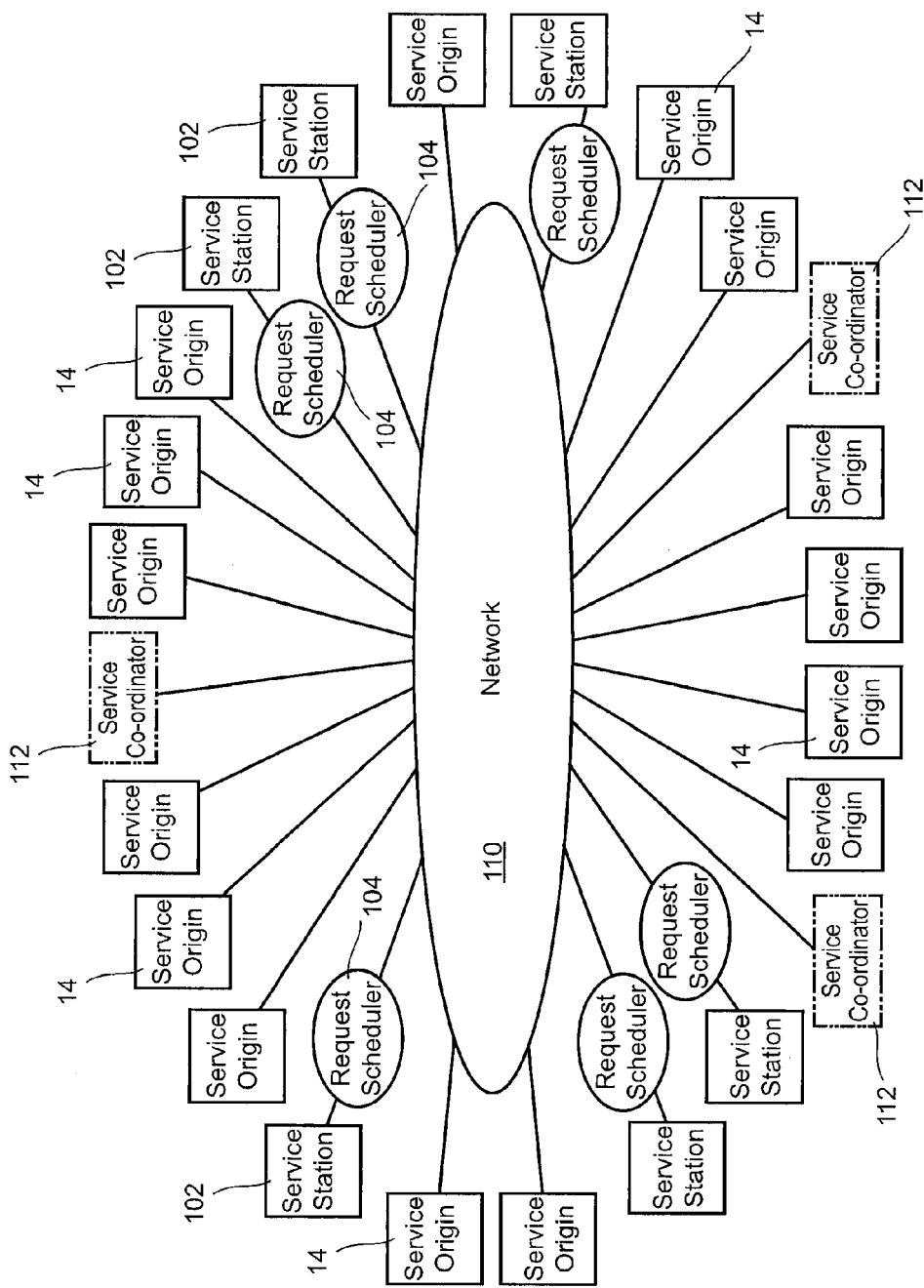
FIG. 3 is a schematic diagram of an embodiment comprising a distributed environment comprising multiple service stations and multiple service origins.

An alternative embodiment is illustrated in FIG. 3. This configuration illustrates a distributed networked environment 200. This distributed environment 200 may represent any distributed environment where a number of service stations 102 exist to serve service requests R coming in from a number of service origins 14 where service requests R originate. The system may have one or more service coordinators 112 who help service origins 14 send service requests R to service stations 102 and get their service completed.

The second embodiment of the data store 200 comprises a plurality of parallel but separate peer service stations 102-i. Each service station 102-i is substantially the same as for the previous embodiment and is connected to the network 110 whereby it is operable to receive requests R from one or more service origins 14. Again, in this embodiment, the requests R comprise metadata identifying payload data (e.g. I/O read/writes) to be sent to the service stations from the service origins. However, service requests may be used for any suitable purpose and may not necessarily relate to I/O or read/write requests. The skilled person will be readily aware of variations which will fall within the scope of the present invention.

Whilst, in FIG. 3, six service stations 102-1, 102-2, 102-3, 102-4 and 102-5 are shown, in principle any number of service stations 102 may be provided as required.

Each service station 102-i has a request scheduler 104-i. The request scheduler 104-i controls the organisation of requests into the service station 102-i. The operational features of the request schedulers 104-i may be implemented in either a hardware or software layer. The skilled person will be readily aware that the above features of the present embodiment could be implemented in a variety of suitable configurations and arrangements within the context of the present invention.

The service stations 102-i communicate over the network 110 such as a local area network (LAN) or the Internet using existing network infrastructure, depending upon the relative location of the service stations 102-i and the request scheduler 104.

Each service coordinator 112 is also operable to communicate with one or more service stations 102-i through the network 110.

Figure 4:
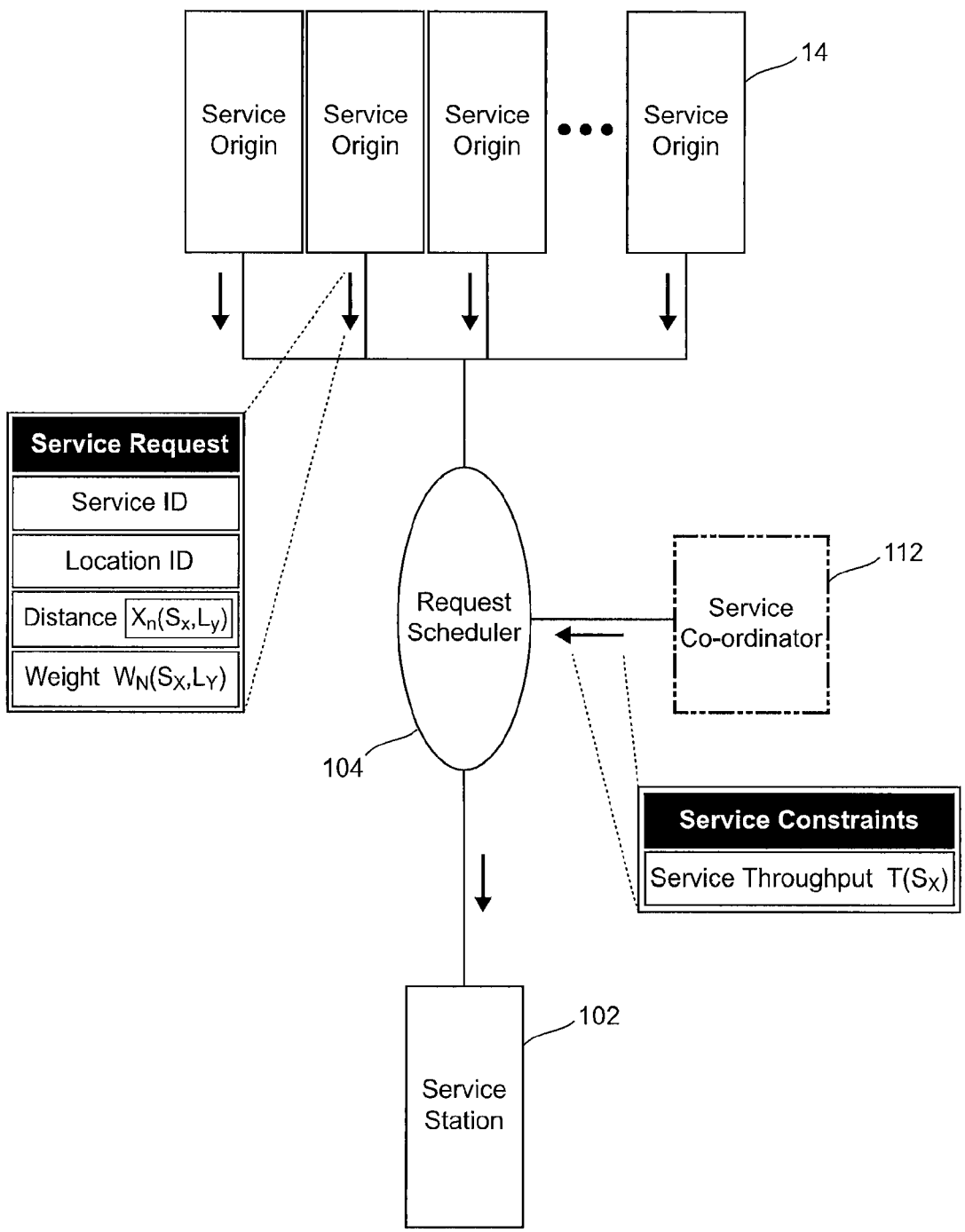
FIG. 4 is a schematic diagram showing the communication between service origins, the request scheduler, request coordinator and service station.

An example of the connections and communication between one or more service origins 14, a service coordinator 112, a request scheduler 104 and service station 102 is shown in FIG. 4. The configuration shown may be used in either of the first or second embodiments.

As shown in FIG. 4, each request R comprises a number of attributes. Depending upon the nature of the request R, these attributes may, for example, comprise I/O metadata at the head of an I/O request.

Each request R has a service ID $S_x$ which identifies the respective service (e.g. software or hardware program or resource) which may be operating on one or more service origins 14.

It is also envisaged that a service having service ID $S_x$ (which may be, as previously described, a software application or other distributed service application or utility) may be distributed across a number of locations (e.g. across a number of service origins 14, or different parts of single system, or merely distributed modules of a service).

Therefore, requests R may be received from a single service ID $S_x$ may be received from multiple service locations. Consequently, a further parameter of location ID $L_y$ is associated with each service ID $S_x$.

Therefore, as an example, a single service ID S1 may be spread across a plurality of locations having, for example, location IDs L1, L2 and L3. The location ID $L_y$ is attached to each service request R.

Each request also has a request number n. The request number represents the number of the request R from service ID $S_x$ and location ID $L_y$. Therefore, the $n^{th}$ request from service ID $S_x$ and location ID $L_y$ would be represented as $R_n(S_x, L_y)$. However, whilst for the purposes of this disclosure each request is associated with a request number n, this need not be the case and each request need not be numbered in practice.

Additionally, each request R has size metadata $w_n(S_x, L_y)$, i.e. metadata pertaining to the volume of data contained in the request $R_n(S_x, L_y)$ from service ID $S_x$ and location ID $L_y$. The size $w_n(S_x, L_y)$ is known as the "weight" of the request R and determines, in part, how long the service station 102 will take to service the I/O request $R_n$.

Additionally, a further parameter of distance $x_n(S_x, L_y)$ is attached with each request. Since, with plural service stations 102-1 to 102-i receiving requests $R_n(S_x, L_y)$ from a plurality of different locations and service IDs, a number of different requests from a particular service ID and location ID may be handled in parallel by different service stations 102-i. Consequently, in order to provide a deadline system which, on aggregate, meets the required service throughput of the service ID $S_x$ for each location ID $L_y$, the request $R_n(S_x, L_y)$ must comprise sufficient information to set a deadline without a priori knowledge of the processing being carried out in other service stations 102.

In other words, each request $R_n(S_x, L_y)$ must comprise self-contained information regarding the relationship of that particular request to previous requests such that request $R_n(S_x, L_y)$ can be processed in the correct timeframe as will be described.

In a sequence of incoming requests for a particular service ID S having location ID L, the distance $x_n(S_x, L_y)$ for the $n^{th}$ request is calculated from equation 1) below:

$$x_n(S_x, L_y) = \sum_{i=0}^{n} w_i(S_x, L_y) \quad 1)$$

where $x_n$ is the distance for request n, and $w_i$ is the weight (I/O size) for request i where i is in the range of 0 to n.

Take, for example, a service ID S1 having location ID L1 and, therefore, requests $R_n(S1, L1)$. In this case, the distance $x_n$ for request n for service ID S1 at location L1 comprises the sum of the I/O sizes of requests 0 (i.e. the first request) to request n−1 from service ID S1 at location ID L1, plus the weight $w_n$ of request $R_n(S1, L1)$ itself.

Concomitantly, for location ID L2 of service ID S1, the distance $x_n$ for request n for service ID S1 at location L2 comprises the sum of the I/O sizes of requests 0 (i.e. the first request) to request n−1 from service ID S2 at location ID L2, plus the weight $w_n$ of request $R_n(S1, L2)$ itself.

Figure 5:
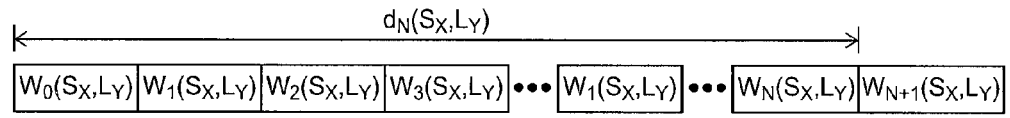
FIG. 5 is a schematic diagram illustrating the distance parameter included with service requests.

The concept of distance is shown diagrammatically in FIG. 5 where the distance parameter can be visualised as the sum of the weights of previous requests plus that of the current request.

In summary, a deadline for a particular request can be utilised which is dependent upon the previous requests from a particular service ID $S_x$ and for a particular location ID $L_y$, i.e. the "distance" from the earlier requests from that service ID $S_x$ and that location ID $L_y$. In this way, an aggregated minimum bandwidth can be guaranteed without administration from a central server attempting to handle distribution across a plurality of service stations to meet a guaranteed bandwidth.

Should a minimum bandwidth be guaranteed for a particular service having service ID $S_x$, service throughput metadata $T(S_x)$ is provided for service ID $S_x$. In this embodiment, the service throughput metadata $T(S_x)$ is supplied by the service coordinator 112 to the request scheduler 104. However, alternatives are possible and the request scheduler 104 may, for example, contain an internal record of the service throughput metadata $T(S_x)$.

The service throughput metadata $T(S_x)$ specifies, for service ID $S_x$, the minimum bandwidth that the service $S_x$ requires. This information is supplied to the request scheduler 104 and is associated with a particular service ID $S_x$. The service throughput information may, for example, be supplied to the request scheduler 104 in the form of an SLA previously agreed prior between the client or service prior to request transmission.

As will be described, the request scheduler 104 is further operable to process and schedule the requests $R_n(S_x, L_y)$ to determine the appropriate order in which to service the requests. The request scheduler 104 is then operable to send the requests $R_n(S_x, L_y)$ in the appropriate order for servicing by the service station 102.

Figure 6:
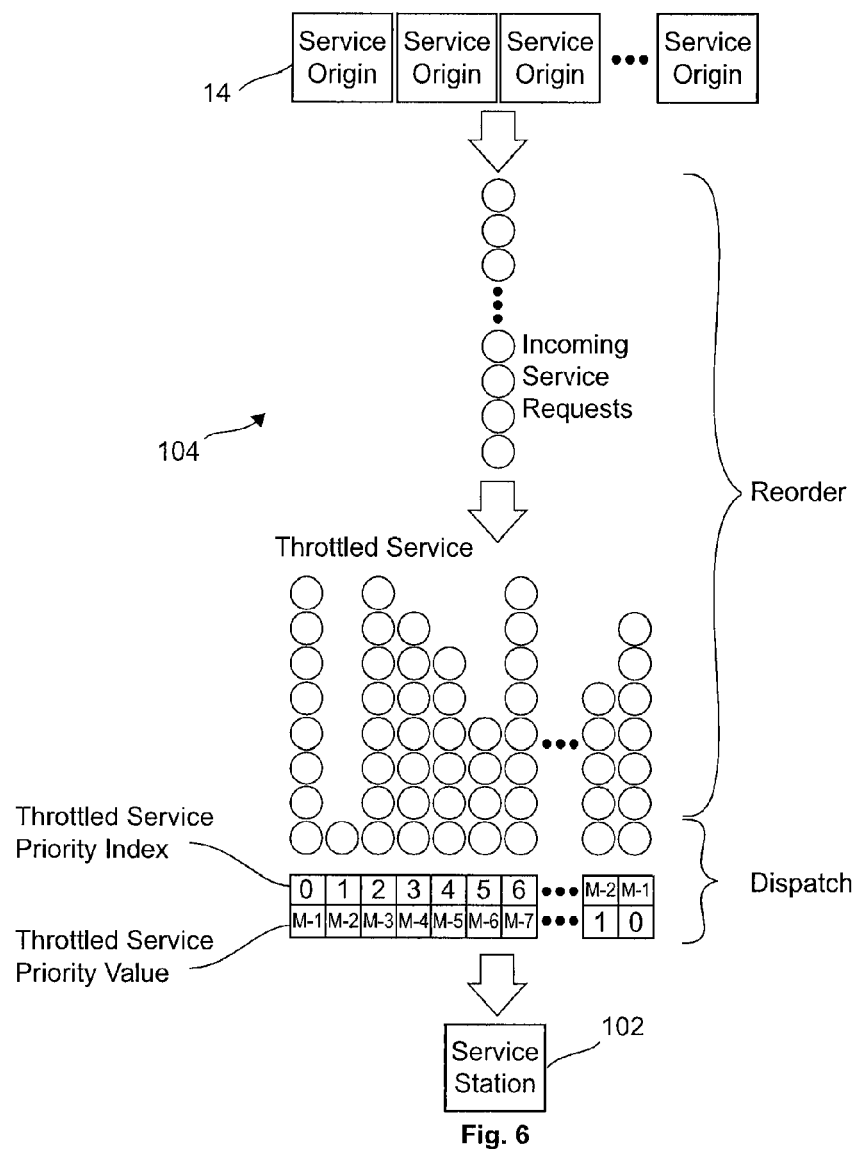
FIG. 6 is a schematic diagram showing the processing of service requests in the request scheduler.
Figure 7:
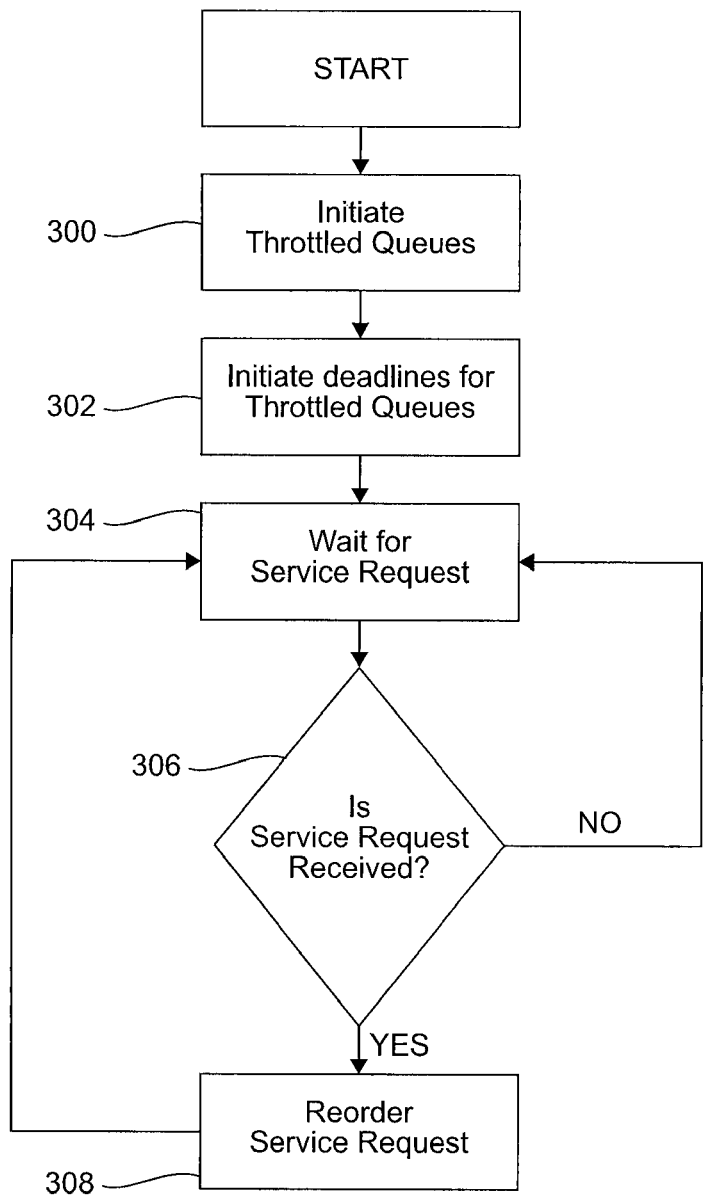
FIG. 7 is a flowchart illustrating the operation of the reordering process in the request scheduler.
Figure 8:
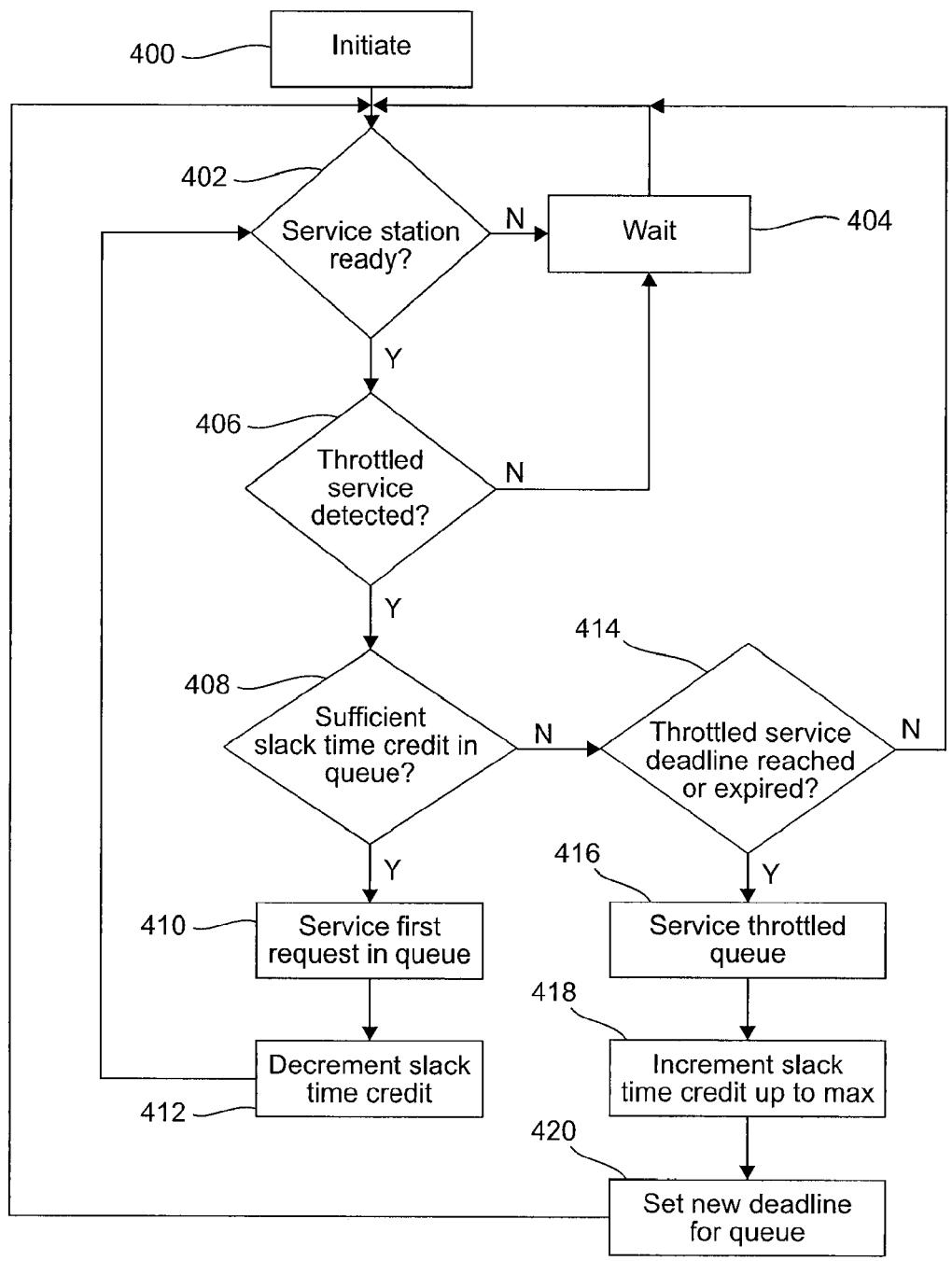
FIG. 8 is a flowchart illustrating the operation of the dispatch process in the request scheduler according to an embodiment.

To illustrate how the parameters of each request $R_n(S_x, L_y)$ are used to provide a guarantee of bandwidth, the method of operation of the present invention will now be described with reference to FIGS. 6 to 8. FIG. 6 shows a schematic diagram of the movement of a request $R_n(S_x, L_y)$ from the service origin 14 to the service station 102. FIGS. 7 and 8 show flow charts representing the method of an embodiment of the invention.

The request scheduler 104 has two independent stages of operation. The first stage is to reorder incoming requests. Once the requests have been reordered, then the second stage of dispatching the requests to the service station 102 can be carried out.

The description of the reordering stage is outlined below.

Step 300: Initiate Throttled Queues

At step 300, the request scheduler 104 configures a plurality of First-In First-Out (FIFO) queues for service.

Step 302: Initiate Deadlines for Throttled Queues

At step 302, an initial service deadline $d_n(S)$ is set. The service deadline $d_n(S)$ specifies the end of a time period within which request n in a queue of requests having service ID S must be serviced in order to meet the service throughput requirements of the throttled queue for a particular service ID S. Initially, when requests are first received, they can effectively be served immediately. Therefore, the initial deadline is set to the current time.

Step 304: Wait for Service Request

At step 304, the request scheduler 104 waits for a service request to be received from one of the service origins. The method then proceeds to step 306.

Step 306: Service Request Received?

At step 306, it is determined whether a service request has been received. If no service request has been received, the method proceeds back to step 306.

However, if a service request is received, the method then proceeds to step 310.

The request scheduler 104 receives the I/O requests $R_n(S_x)$, each of which includes the service ID S and I/O size $w_n(S_x)$ and, optionally, may have service throughput metadata $T(S_x)$ associated therewith, from the service origin 14 via the network.

Step 308: Reorder Incoming Requests by Service ID

Once the requests $R_n(S_x, L_y)$ have been received, the request scheduler 104 reorders the requests into First-In First-Out (FIFO) queues for service. At step 308, the incoming requests $R_n(S_x, L_y)$ are sorted by service ID $S_x$ and allocated to an individual service so that each queue contains only requests $R_n(S_x, L_y)$ from the particular service having that service ID $S_x$.

The method then proceeds back to step 304 to process and reorder other incoming requests.

The method above operates continuously in the request scheduler 104 when in operation. Once the requests are organised into appropriate queues, then they can be dispatched to the respective service station 102 in the next stage of operation.

The dispatch process will be described with reference to FIG. 8.

Step 400: Initiate

At step 400, the dispatch process is initiated. The method then proceeds to step 402.

Step 402: Is Service Station Ready?

At step 402, it is determined whether the service station is ready to receive a new service request, i.e. if it has finished servicing the previous request the service station 102 has been handling. If not, the method proceeds to step 404.

If the service station is ready to service a new request, the method proceeds to step 406.

Step 404: Wait

At step 404, the method waits for a predetermined time to enable the service station to complete the current request and be ready to receive a new request. This time period may be any suitable time period.

Step 406: Throttled Service Request Detected?

In step 406, the request scheduler will detect whether any throttled queues are present. If not, the method proceeds back to step 402. If throttled queue(s) are detected, then the method continues below.

Each throttled queue has both a service deadline $d_n(S_x, L_y)$ and a slack time credit parameter. The service deadline $d_n(S_x, L_y)$ is a deadline by which the first request in a particular queue must be serviced in order to meet the throughput requirements of that queue.

Slack time credit is an accumulated value of the amount of time by which one or more deadlines for servicing previous requests in that queue has been missed. Initially, the slack time $st(S_x, L_y)$ is set to zero, i.e. before any deadlines have expired. If a first request $R_n(S_x, L_y)$ in line in queue Sx is serviced by the deadline set for it, then the slack time $st(S_x, L_y)$ will remain at zero. However, if a previously-serviced request had missed the deadline by a particular amount of time, then the slack time credit $st(S_x, L_y)$ will be incremented with that amount of time, up to a particular limit. In this embodiment, the maximum limit is 100 ms.

The request scheduler 104 examines the slack time credit $st(S_x, L_y)$ and the service deadline $d_n(S_x, L_y)$ for the highest priority queue (in this example, the leftmost queue in FIG. 3). Where there are M services, the queue having the highest priority value (M−1). Consequently, the M−1$^{th}$ service has a priority value of 0, i.e. the lowest value of priority, and this queue will be served last in the throttled queues.

Priority ordering provides predictable performance degradation or performance improvement when system capability becomes respectively low or high. The lower priority services will not meet deadlines and will suffer from performance degradation when the system capability becomes low and not enough to server all throttled queues. The lower priority services will improve gradually as system capability improves.

Additionally, the throttling mechanism falls back to a priority based servicing when the system capability is not enough to meet all throttled service requests. In other words, setting high throughput values for all or some of the queues means deadlines will expire quickly and queues will be served in their priority order.

The request scheduler 104 will attempt to use slack time credit to service a request first, starting with the highest priority throttled queue. The method proceeds to step 408.

Step 408: Sufficient Slack Credit in Queue?

The value of slack time for the currently examined queue is determined. This is done by noting the slack time credit which will comprise a particular value of slack time $st(S_x, L_y)$ for service queue $S_x$. The accumulated slack time $st(S_x, L_y)$ is measured in milliseconds (ms).

In step 408, the request scheduler 104 is operable to determine whether the accumulated slack time $st(S_x, L_y)$ is sufficient to immediately service the first request $R_n(S_x, L_y)$ in the selected FIFO queue. This is determined by a comparison of the weight $w_n$ of the next request $R_n(S_x, L_y)$ in the FIFO queue and the available slack time credit in that queue. Weight can be converted into a time required to service that particular weight by dividing by the required throughput specified for that queue to determine the slack time credit $\Delta st(S_x, L_y)$ required to service that request as set out in equation 2):

$$\Delta st(S_x, L_y) = \frac{1000 \times w_n(S_x, L_y)}{T(S_x)} \qquad 2)$$

where $\Delta st(S_x, L_y)$ is the slack time credit required to service request $R_n(S_x, L_y)$ having weight $w_n(S_x, L_y)$ in queue $S_x$ having required throughput $T(S_x)$. Note that the 1000 multiplication factor applies where time is measured in milliseconds (ms) and $T(S_x)$ is specified in MB/s.

If sufficient slack time credit exists to service the request immediately, then the method proceeds to step 410.

However, if the queue has insufficient slack time credit to service the first request in line, the method proceeds to step 414.

Step 410: Service Request Using Slack Credit

If, in step 408, it is determined that there is sufficient slack time credit $\Delta st(S_x, L_y)$ in order to service the first request $R_n(S_x, L_y)$, then the request scheduler 104 will service first request $R_n(S_x, L_y)$ in line in that queue. Since the examining step 406 is carried out in priority order, in practice this means that requests $R_n(S)$ in the throttled queues are serviced starting with the throttled queue having the highest priority.

When a queue is serviced, the request scheduler 104 passes the respective I/O request $R_n(S_x, L_y)$ at the head of that particular queue to the service station 102 for processing. The method proceeds to step 412.

Step 412: Decrement Slack Time Credit

Once the request has been serviced in step 410, the slack time credit counter for that queue is decremented by an amount equal to the slack time credit $\Delta st(S_x, L_y)$ used in servicing the request in step 410. This is done in accordance with equation 3):

$$st(S_x, L_y) = st(S_x, L_y) - \Delta st(S_x, L_y) \qquad 3)$$
$$= st(S_x, L_y) - \frac{1000 \times w_n(S_x, L_y)}{T(S_x)}$$

The method then proceeds back to step 402. Note that the 1000 multiplication factor applies where time is desired in milliseconds (ms), weight in MB and $T(S_x)$ is specified in MB/s.

Step 414: Examine Deadline for Queue-Deadline Reach or Expired?

If insufficient slack time credit is available to service the queue in question, the deadline $d_n(S_x, L_y)$ for the queue is examined. If the deadline for the highest priority throttled queue has not yet been reached, the request scheduler 104 moves to the next throttled queue in line in priority order and returns to step 406 for that queue.

However, if the queue has a deadline which has been reached or has passed, the method proceeds to step 416.

Step 416: Serve Queue for Which Deadline has Been Reached or Passed

If in step 414, it is detected that a queue has a deadline which has been reached or has expired, then the request scheduler 104 will service first request $R_n(S_x, L_y)$ in line in that queue. When a queue is serviced, the request scheduler 104 passes the respective I/O request $R_n(S_x, L_y)$ at the head of that particular queue to the service station 102 for processing.

The method then proceeds to step 418.

Step 418: Increment Slack Time Credit if Max Value not Reached

The amount of time by which the deadline for the request serviced in step 416 was missed is added to the slack time credit counter in step 418. However, the slack time credit counter has a maximum value which cannot be exceeded. In this embodiment, the maximum value of the slack time is 100 ms. However, it is to be understood that other values could be used as appropriate.

Essentially, the maximum value of slack time determines how many requests can be serviced before a deadline is set in a later step. Therefore, an unbounded value of slack time credit will lead to excessive consumption of bandwidth by a particular service queue. Consequently, a maximum value is imposed which, if reached, will not be exceeded irrespective of any further increments of slack time credit.

By way of example, if the maximum value is 100 ms, the current accumulated slack time credit is 90 ms and the addition required to be added to the slack time credit is 15 ms, then the slack time credit value will be incremented to 100 ms but not beyond. Any further increments will not be added.

Therefore, the slack time credit for queue Sx (i.e. $st(S_x, L_y)$) will be incremented by an amount $\Delta st(S_x, L_y)$ equal to the time by which the deadline was missed up to the maximum allowable value in accordance with equation 4)

$$st(S_x, L_y) = st(S_x, L_y) - \Delta st(S_x, L_y) \qquad 4)$$
$$= st(S_x, L_y) + c.t.d_n(S_x, L_y)$$

where c.t. is the current time and $d_n(S_x, L_y)$ is the deadline set by which request $R_n(S_x, L_y)$ should have been serviced.

The slack time $st(S_x, L_y)$ for service queue $S_x$ is, therefore, incremented by an amount equal to that set out in equation 2) above for the request services in step 416 up to the maximum allowable. This may be in the form of a counter or other variable which stores the current amount of slack time for that particular service queue.

The method proceeds to step 420.

Step 420: Set New Deadline for Serviced Queue

At step 420, once the throttled queue has been serviced in step 416, a new deadline is set by which time the next request $R_n(S_x, L_y)$ in the FIFO queue is to be serviced. The new deadline $d_n(S_x, L_y)$ to be set is dependent upon the nature of the system and the required throughput.

The simplest case is for the configuration shown in FIG. 2. In this arrangement, a service having service ID $S_x$ originating from a single location having location ID $L_y$ sends requests to a single service station 102.

In this particular case, the location ID $L_y$ is not needed. Therefore, it may optionally be omitted from the service request R. Alternatively, if the location ID $L_y$ is included in the service request R, it can be effectively ignored by the service station 102 because there will only be one location ID $L_y$ in each queue.

Additionally, where a single service station 102 is used, the distance parameter is not required. Therefore, the service request R in this situation may omit the distance parameter. Alternatively, the distance parameter may simply be ignored by the service station 102.

Consequently, requests from a single service ID at a single location to a single service station need only comprise the parameters of service ID and weight. Other parameters may be required and not used, depending upon the particular network configuration.

For the configuration of a single service sending requests from a single location to a single service station, the deadline $d_n(S_x)$ (where y is a constant) is then set based on the I/O size $w_n(S_x)$ of, and service throughput metadata $T(S_x)$ associated with, the next throttled request $R_n(S_x)$ in line in the relevant queue. Therefore, the deadline is set according to equation 5):

$$d_n(S_x) = c.t. + \frac{w_n(S_x)}{T(S_x)} \qquad 5)$$

where $d_n$ is the deadline for the queue for requests having service ID $S_x$, c.t. is the current time, $w_n$ is the I/O size (in bytes) and $T(S_x)$ is the required service throughput (in Mb/s) associated with service ID $S_x$.

In other words, the new deadline is the current time plus the time required to process a given amount of data in a request at a required data rate (or bandwidth). Meeting this deadline will mean that the required service throughput is achieved.

In an alternative configuration, a service having service ID $S_x$ and a single location ID $L_y$ may send requests to multiple service stations. In this arrangement, each service station 102 sets deadlines independently of each other service station 102 and there is no communication therebetween. Consequently, it is necessary to utilise the distance parameter. However, again, in this example the location ID $L_y$ is effectively a constant, and so it can be ignored in the following description.

The new deadline $d_n(S_x)$ for the next request $R_n(S_x)$ set in dependence upon a number of factors. As for the first example, the deadline $d_n(S_x)$ for request $R_n(S_x)$ is dependent upon the I/O size $w_n(S_x)$ and service throughput metadata $T(S_x)$ for the requests having service ID $S_x$. However, the deadline is set with the aim of achieving aggregated throughput across all of the service stations 102-1-102-i, i.e. achieving the requirements set out in the service throughput metadata $T(S_x)$ but in parallel with other service stations 102 processing requests from the same service having service ID S. Therefore, the distance parameter x is required, together with a further parameter, the last served distance l.

The last served distance parameter l is, effectively, the distance of the last served request in the queue for service ID $S_x$. In other words, for request $R_n(S_x)$ the last served distance $l_n$ would be equal to the distance of the previously served request $R_m(S_x)$ (i.e. the request most recently processed in step 408), as set out in equation 6):

$$l_n(S_x) = \sum_{i=0}^{m} w_i(S_x) \qquad 6)$$

where $l_n$ is the last served distance for request $R_n(S_x)$ which is equal to the distance of request $R_m(S_x)$, i.e. sum of the weights of requests $R_0(S_x)$ to $R_m(S_x)$.

The deadline for request $R_n(S_x)$ is, thus, calculated according to equation 7):

$$d_n(S_x) = c.t. + \frac{(x_n(S_x) - l_n(S_x))}{T(S_x)} \qquad 7)$$

where $d_n$ is the deadline for request $R_n(S_x)$, c.t. is the current time, $w_n$ is the I/O size (or weight) (in bytes) of request $R_n$, $x_n$ is the distance parameter of request n, $l_n$ is the last served distance for request $R_n$ (equal to the distance of previously-served request $R_m$) of service station 102-j and T is the required service throughput (in Mb/s).

In other words, the new deadline is the current time plus the time required to process a given amount of data in a request at a required data rate (or bandwidth) in order to achieve an aggregated throughput across all of the service stations 102-i to which requests having a particular service ID S have been sent. Meeting this deadline will mean that the required service throughput is achieved.

Figure 9:
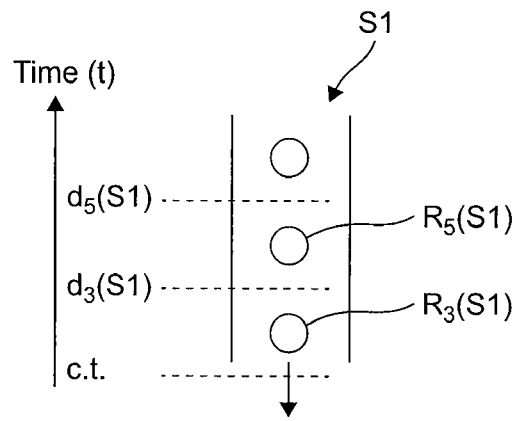
FIG. 9 is a schematic illustration of a single FIFO queue as scheduled by the request scheduler.

FIG. 9 provides an example of this. In a queue comprising service requests from service ID S1 having a single location ID L1 (omitted from the Figure for clarity), the head request $R_3(S1)$ is immediately followed by request $R_5(S1)$.

$R_3(S1)$ is the first request in the queue, and so has a distance $x_3$ equal to $w_1+w_2+w_3$, and a last served distance $l_3$ equal to 0 (because this is the first request in the queue, there is no last served distance). Therefore, the deadline $d_3(S1)$ for request $R_3(S1)$ is equal to equation 8):

$$d_3(S1) = c.t. + \frac{(w1 + w2 + w3) - 0}{T(S1)} \qquad 8)$$

Once request $R_3(S1)$ has been served, $R_5(S1)$ is the next request in line for servicing. The distance $x_5$ for $R_5(S1)$ is equal to $w_1+w_2+w_3+w_4+w_5$ and the last served distance $l_5$ for $R_5(S1)$ is equal to the distance of $R_3(S1)$ or $w_1+w_2+w_3$. Therefore, the deadline for $R_5(S1)$ is equal to equation 9):

$$d_5(S1) = c.t. + \frac{(w1 + w2 + w3 + w4 + w5) - (w1 + w2 + w3)}{T(S1)} \qquad 9)$$

Which means that the new deadline for request $R_5(S1)$ is equal to equation 10):

$$d_5(S1) = s.t. + \frac{w4 + w5}{T(S1)} \qquad 10)$$

In the final case, services having a service ID $S_x$ originate from a number of locations having location IDs $L_y$ and are serviced by a number of service stations 102. This is done by utilising a deadline for a particular request which is dependent upon the previous requests from a particular service ID $S_x$ and for a particular location ID $L_y$, i.e. the "distance" from the earlier requests from that service ID $S_x$ and for that location ID $L_y$. In this way, an aggregated minimum bandwidth can be guaranteed without administration from a central server attempting to handle distribution across a plurality of service stations to meet a guaranteed bandwidth.

In a sequence of incoming requests for a particular service ID S having location ID L, the distance $x_n(S_x, L_y)$ for the $n^{th}$ request is calculated from equation 11) below (which is identical to equation 1)):

$$x_n(S_x, L_y) = \sum_{i=0}^{n} w_i(S_x, L_y) \qquad 11)$$

where $x_n$ is the distance for request n, and $w_i$ is the weight (I/O size) for request i where i is in the range of 0 to n.

Take, for example, a service ID S1 having location ID L1 and, therefore, requests $R_n(S1, L1)$. In this case, the distance $x_n$ for request n for service ID S1 at location L1 comprises the sum of the I/O sizes of requests 0 (i.e. the first request) to request n−1 from service ID S1 at location ID L1, plus the weight $w_n$ of request $R_n(S1, L1)$ itself.

Concomitantly, for location ID L2 of service ID S1, the distance $x_n$ for request n for service ID S1 at location L2 comprises the sum of the I/O sizes of requests 0 (i.e. the first request) to request n−1 from service ID S2 at location ID L2, plus the weight $w_n$ of request $R_n(S1, L2)$ itself.

Knowing the time in which these requests need to be serviced (i.e. the I/O sizes divided by the service throughput T(S1)) enables a deadline system which is able, on aggregate, to meet bandwidth requirements across the distributed system and to meet these requirements fairly across all of the locations of the service having service ID S1. Where $l_m$ is the last served distance for request $R_n(S_x, L_y)$ which is equal to the sum of the weights of requests $R_0(S_x, L_y)$ to $R_m(S_x, L_y)$ as set out in equation 12):

$$l_n(S_x, L_y) = \sum_{i=0}^{m} w_i(S_x, L_y) \quad 12)$$

The deadline for request $R_n(S, L)$ is, thus, calculated according to equation 13):

$$d_n(S_x, L_y) = c.t. + \frac{(x_n(S_x, L_y) - l_n(S_x, L_y))}{T(S_x, L_y)} \quad 13)$$

where $d_n$ is the deadline for request $R_n(S_x, L_y)$, c.t. is the current time, $w_n$ is the I/O size (or weight) (in bytes) of request $R_n(S_x, L_y)$ $x_n$ is the distance parameter of request n, $l_n$ is the last served distance for request $R_n(S_x, L_y)$ (equal to the distance of previously-served request $R_m(S_x, L_y)$) of service station 102 and $T(S_x)$ is the required service throughput (in Mb/s).

Therefore, in this embodiment, the deadlines for each service ID $S_x$ having location ID $L_y$ are effectively independent between location IDs. In other words, within a single queue, the deadline for request $R_n(S1, L1)$ is dependent upon the distance of the most recently-served request $R_m(S1, L1)$ having the same location ID L1. Other requests in the same queue having different location IDs do not affect the deadline for request $R_n(S1, L1)$.

Therefore, in this embodiment, the last served distance is not necessarily that of the previous request in the queue for service ID $S_x$, but for the previous request in the queue having the same location ID $L_y$.

In other words, for a given location ID $L_y$, the new deadline is the current time plus the time required to process a given amount of data in a request at a required data rate (or bandwidth) in order to achieve an aggregated throughput across all of the service stations 302 to which requests having a particular service ID $S_x$ have been sent. Meeting this deadline will mean that the required service throughput is achieved.

Figure 10:
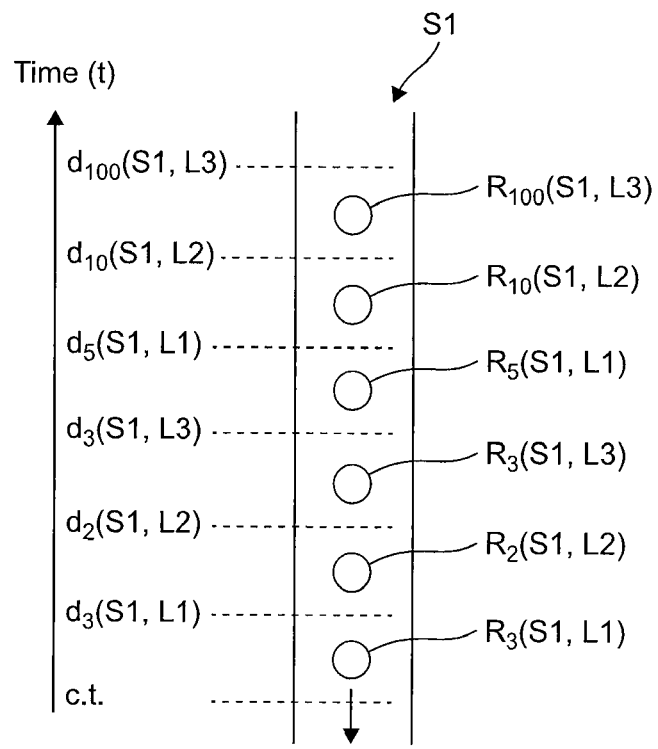
FIG. 10 is a schematic illustration of a single FIFO queue as scheduled by the request scheduler.

FIG. 10 provides an example of this. In a queue comprising service requests from service ID S1 and location IDs L1 to L3, the head request $R_3(S1, L1)$ is immediately followed by the following sequence of requests: $R_2(S1, L2)$, $R_3(S1, L3)$, $R_5(S1, L1)$, $R_{10}(S1, L2)$ and $R_{100}(S1, L3)$.

$R_3(S1, L1)$ is the first request in the queue, and so has a distance $x_3(S1, L1)$ equal to $w_1(S1, L1)+w_2(S1, L1)+w_3(S1, L1)$ and a last served distance $l_3(S1, L1)$ equal to 0 (because this is the first request in the queue, there is no last served distance). Therefore, the deadline $d_3(S1, L1)$ for request $R_3(S1, L1)$ is equal to equation 14):

$$d_3(S1, L1) = c.t. + \frac{(w1(S1, L1) + w2(S1, L1) + w3(S1, L1)) - 0}{T(S1)} \quad 14)$$

Once request $R_3(S1, L1)$ has been served, $R_2(S1, L2)$ is the next request in line for servicing. The distance $x_2(S1, L2)$ for $R_2(S1, L2)$ is equal to $w_1(S1, L2)+w_2(S1, L2)$ and the last served distance $l_2$ for $R_2(S1, L2)$ is equal to 0, since this is the first request for location ID L2. The deadline $d_2(S1, L2)$ can then be calculated as for $R_3(S1, L1)$ in equation 11) above.

Once request $R_2(S1, L2)$ has been served, the next request in line is $R_3(S1, L3)$. The distance $x_3(S1, L3)$ for $R_3(S1, L3)$ is equal to $w_1(S1, L3)+w_2(S1, L3)+w_3(S1, L3)$ and the last served distance $l_3(S1, L3)$ for $R_3(S1, L3)$ is equal to 0, since this is the first request for location ID L3. The deadline $d_3(S1, L3)$ can then be calculated as for $R_3(S1, L1)$ in equation 11) above.

The next request in line is $R_5(S1, L1)$. The distance $x_5(S1, L1)$ for $R_5(S1, L1)$ is equal to $w_1(S1, L1)+w_2(S1, L1)+w_3(S1, L1)+w_4(S1, L1)+w_5(S1, L1)$ and the last served distance $l_5$ for $R_5(S1, L2)$ is equal to the distance of the previously served request for location ID L1, namely $R_3(S1, L1)$, or $w_1(S1, L1)+w_2(S1, L1)+w_3(S1, L1)$.

Therefore, the deadline $d_5(S1, L1)$ is equal to equation 15):

$$d_5(S1, L1) = c.t. + \frac{\begin{pmatrix} w1(S1, L1) + w2(S1, L1) + w3(S1, L1) + \\ w4(S1, L1) + w5(S1, L1) \end{pmatrix} -}{T(S1)} - \frac{(w1(S1, L1) + w2(S1, L1) + w3(S1, L1))}{T(S1)} \quad 15)$$

which means that the new deadline for request $R_5(S1)$ is equal to:

$$d_5(S1, L1) = c.t. + \frac{w4(S1, L1) + w5(S1, L1)}{T(S1)} \quad 16)$$

The penultimate and final requests in the queue shown in FIG. 10, $R_{10}(S1, L2)$ and $R_{100}(S1, L3)$, can be calculated in a similar manner with, for example, $R_{100}(S1, L3)$ having a last served distance, $l_{100}(S1, L3)$ equal to the distance of the previously served request from location ID L3, namely $R_3(S1, L3)$.

Once the new deadline has been set, the method then proceeds back to step 402.

It will be appreciated that not all of the above variables are necessary in each case. For example, as set out in the case of a single service station arranged serve all requests in a distributed system, the distance parameter is not required. Since all service requests with weights are directed toward a single service station the service station itself can determine the distance if necessary.

Additionally, some service requests may come with zero weight meaning that the service station that receives this service request wastes no efforts to complete this service request.

In the above disclosure, the service rate, i.e., the rate at which a service station works to complete a service request is Weight/Time where Time is time taken to complete service request.

For a group of service requests, i.e., service requests with same service ID, service throughput corresponds to average service rate over all the service requests completed so far.

Figure 11:
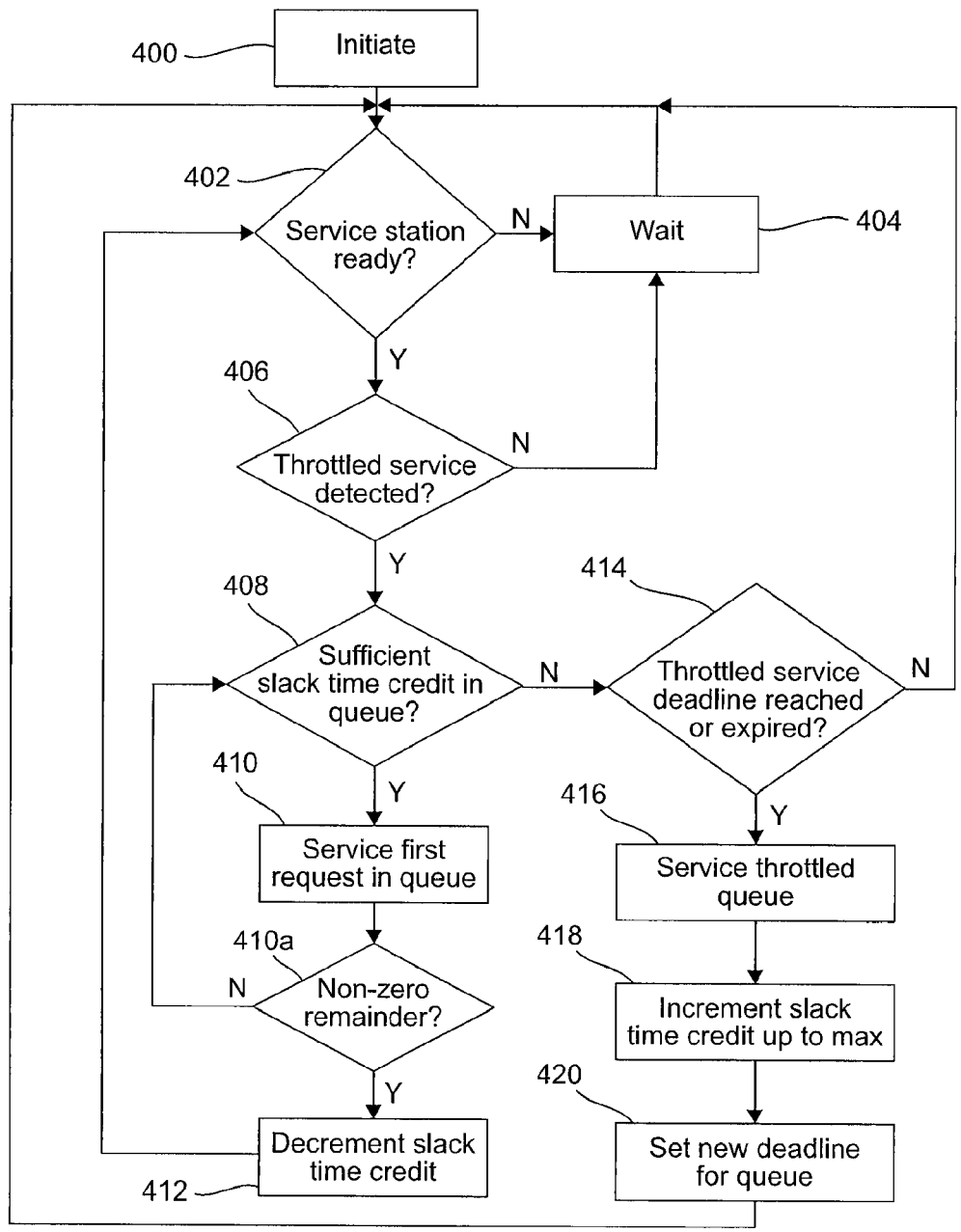
FIG. 11 is a flowchart illustrating the operation of the dispatch process in the request scheduler according to an alternative embodiment.

In an alternative embodiment of the present invention as illustrated in FIG. 11, additional steps may be implemented. Same numbered steps as set out above are, however, in common with the embodiment described above.

Step 410a: Determine Remainder

In the previous embodiment, once the request has been serviced in step 410, the slack time credit counter for that queue is decremented (in step 412) by an amount equal to the slack time credit $\Delta st(S_x, L_y)$ used in servicing the request in step 410. This is done in accordance with equation 3) above.

However, in this embodiment, a parameter of slack time remainder may be used. This is a useful parameter in cases where the rounding off error in delay is significant. For example, in an embodiment where the method described above is implemented in Linux kernel space, only integers can be handled and any rounding off errors will have a significant impact on the throughput at higher throughput rates.

In reality the problem is further compounded by the fact that service weights are not constants but varying. Some parallel filesystems such as Lustre mostly operate with 1 MB constant service weight but there is no guarantee it will always remain 1 MB or any other constant weight.

Consequently, to avoid rounding off errors, the request scheduler 104 is operable to determine the slack time remainder $\Delta r$ for the slack time credit $\Delta st(S_x, L_y)$ to be decremented corresponding to the request passed in step 410. This is, as set out in equation 17):

$$\Delta st(S_x, L_y) = \frac{1000 \times w_n(S_x, L_y)}{T(S_x)} \qquad 17)$$

where $w_n$ is the weight of the request passed in step 410.

The slack time remainder $\Delta r$ for this change in slack time credit is defined in equation 18) as the modulo or remainder operator:

$$\Delta r = 1000(w_n(S_x, L_y) \% T(S_x)) \qquad 18)$$

Or, expressed fully as equation 19):

$$\Delta r = 1000 w_n(S_x, L_y) - \left(T(S_x) \times \mathrm{int}\left(\frac{1000 w_n(S_x, L_y)}{T(S_x)}\right)\right) \qquad 19)$$

Where $\mathrm{int}(st(S_x, L_y))$ is the largest integer less than or equal to $st(S_x, L_y)$ and the remainder is measured in milliseconds.

If the remainder as defined in equation 19) is zero, then the method proceeds to new step 412 below. However, if the remainder is non-zero, the method proceeds back to step 408. If, in step 408, sufficient slack time credit exists to service the next request in the queue, then the request is serviced in step 410. Subsequently, the remainder for the two requests passed in the repetition of step 410 is calculated in step 410a, where $w_n$ in this case will comprise the weight of the two serviced requests as set out in equation 20) below.

Again, if the remainder is zero, then the method proceeds to step 412. Otherwise, the method proceeds back to step 408. This continues until there is insufficient slack time credit to service further requests, in which case the method proceeds to step 412 in this case. The general case for the calculation of the remainder is set out in equation 20) and 21), where the weight used in the calculation is the sum of weights of requests 1 to i passed in one or more iterations of step 410:

$$\Delta r = 1000\left(\sum_{1}^{i} w_n(S_x, L_y) \% T(S_x)\right) \qquad 20)$$

Or, expressed fully as equation 21):

$$\Delta r = 1000 \sum_{1}^{i} w_n(S_x, L_y) - \left(T(S_x) \times \mathrm{int}\left(\frac{1000 \sum_{1}^{i} w_n(S_x, L_y)}{T(S_x)}\right)\right) \qquad 21)$$

Step 412: Decrement Slack Time Credit

Once one or more requests have been serviced in step 410 and either there is insufficient slack time credit remaining or the remainder of the change in slack time credit is zero, the slack time credit counter for that queue is decremented by an amount equal to the slack time credit $\Delta st(S_x, L_y)$ used in servicing the one or more requests in step 410 or in repetitions thereof. This is done in accordance with equation 22):

$$st(S_x, L_y) = st(S_x, L_y) - \Delta st(S_x, L_y) \qquad 22)$$

$$= st(S_x, L_y) - \frac{1000 \times \sum_{1}^{i} w_n(S_x, L_y)}{T(S_x)}$$

The method then proceeds back to step 402. Note that the 1000 multiplication factor applies where time is desired in milliseconds (ms), weight in MB and $T(S_x)$ is specified in MB/s.

The remaining steps are as set out in the previous embodiment.

Figure 12:
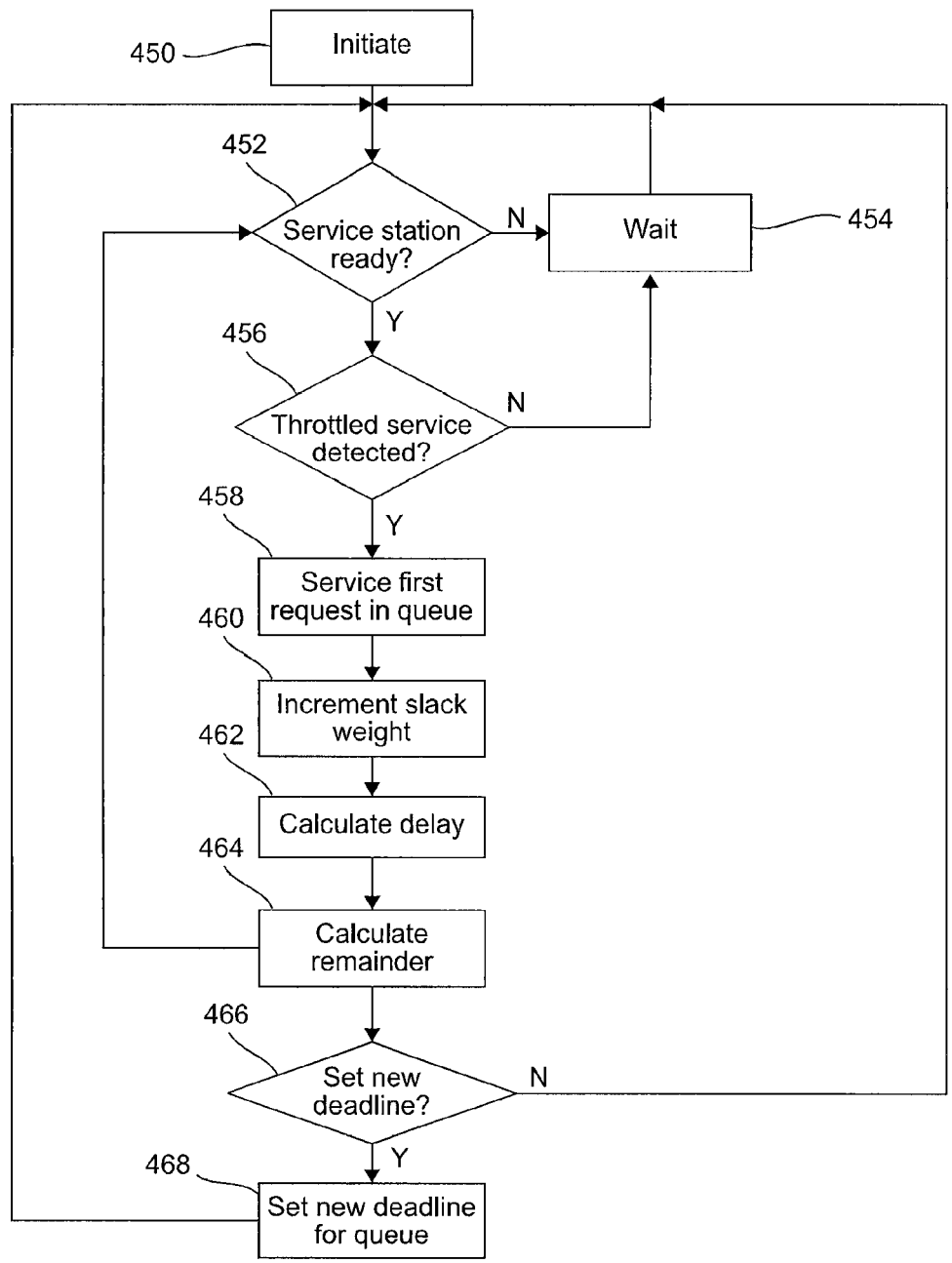
FIG. 12 is a flowchart illustrating the operation of the dispatch process in the request scheduler according to an alternative embodiment.

An alternative embodiment is set out in FIG. 12. In the embodiment of FIG. 12, the slack time credit mechanism is replaced with a slack weight parameter as will be described below. The dispatch process according to the alternative embodiment is set out below.

Step 450: Initiate

At step 450, the dispatch process is initiated. The method then proceeds to step 452.

Step 452: Is Service Station Ready?

At step 452, it is determined whether the service station is ready to receive a new service request, i.e. if it has finished servicing the previous request the service station 102 has been handling. If not, the method proceeds to step 454.

If the service station is ready to service a new request, the method proceeds to step 456.

Step 454: Wait

At step 454, the method waits for a predetermined time to enable the service station to complete the current request and be ready to receive a new request. This time period may be any suitable time period.

Step 456: Throttled Service Request Detected?

Each throttled queue has both a service deadline $d_n(S_x, L_y)$ and a slack weight parameter $sw(S_x, L_y)$. The service deadline $d_n(S_x, L_y)$ is a deadline by which the first request in a particular queue must be serviced in order to meet the throughput requirements of that queue.

Slack weight $sw(S_x, L_y)$ is an accumulated value of the weight of one or more service requests which have been serviced. Initially, the slack weight $sw(S_x, L_y)$ is set to zero. If a first request $R_n(S_x, L_y)$ in line in queue Sx is serviced, then the slack weight $sw(S_x, L_y)$ will be incremented with that amount of weight, up to a particular limit. In this embodiment, the maximum limit is expressed as a delay time and is 100 ms. The delay time can be obtained from the slack weight $sw(S_x, L_y)$ in that queue and the known throughput for that queue.

The request scheduler 104 examines the service deadline $d_n(S_x, L_y)$ and the slack weight $sw(S_x, L_y)$ for each throttled queue, starting with the highest priority queue (in this example, the leftmost queue in FIG. 3), i.e. the queue having the highest priority M. If the deadline for the highest priority throttled queue has not expired, the request scheduler 104 moves to the next throttled queue in line.

This process continues until a throttled queue is reached which has a deadline which has expired. At this point, the method proceeds to step 458.

If, however, the request scheduler 104 reaches the end of the throttled queues and none of the queues has a deadline which has passed, then the method proceeds to step 452.

Step 458: Serve Queue

If, in step 456, it is detected that a queue has a deadline which has been reached or has expired, then the request scheduler 104 will service first request $R_n(S_x, L_y)$ in line in that queue.

When a queue is serviced, the request scheduler 104 passes the respective I/O request $R_n(S_x, L_y)$ at the head of that particular queue to the service station 102 for processing. The method then proceeds to step 460.

Step 460: Increment Slack Weight

Subsequent to the servicing in step 458 of the request $R_n(S_x, L_y)$ for which the service deadline was exceeded, the slack weight parameter for queue Sx (i.e. $sw(S_x, L_y)$) will be incremented by an amount equal to the weight $w_n(S_x, L_y)$ of the delayed service request $R_n(S_x, L_y)$ which missed the deadline but has now been serviced, as set out in equation 23)

$$sw(S_x, L_y) = sw(S_x, L_y) + w_n(S_x, L_y) \qquad 23)$$

The slack weight $sw(S_x, L_y)$ for service queue $S_x$ is, therefore, incremented by an amount equal to that set out in equation 19) above. This may be in the form of a counter or other variable which stores the current amount of slack weight for that particular service queue.

The method proceeds to step 462.

Step 462: Calculate Delay

Given a particular service throughput $T(S_x)$ for service queue $S_x$, the slack weight $sw(S_x, L_y)$ parameter can be converted into a delay parameter $\Delta t(S_x, L_y)$ according to equation 24):

$$\Delta t(S_x, L_y) = \frac{1000 \times sw(S_x, L_y)}{T(S_x)} \qquad 24)$$

where $\Delta t(S_x, L_y)$ is the delay corresponding to slack weight $sw(S_x, L_y)$ in queue $S_x$ having required throughput $T(S_x)$.

The method then proceeds to step 464.

Step 464: Calculate Remainder

In this embodiment, a parameter of slack weight remainder may be used. This is a useful parameter in cases where the rounding off error in delay is significant. For example, in an embodiment where the method described above is implemented in Linux kernel space, only integers can be handled and any rounding off errors will have a significant impact on the throughput at higher throughput rates. The proposed solution accumulates slack weights until it completely eliminates round off errors.

In reality the problem is further compounded by the fact that service weights are not constants but varying. Some parallel filesystems such as Lustre mostly operate with 1 MB constant service weight but there is no guarantee it will always remain 1 MB or any other constant weight.

Consequently, to avoid rounding off errors, the request scheduler 104 is operable to determine both the value of the slack weight delay (in step 462) and the slack weight remainder $\Delta r$. The slack weight remainder $\Delta r$ is defined in equation 25) as the modulo or remainder operator:

$$\Delta r = (1000 sw(S_x, L_y)) \% T(S_x) \qquad 25)$$

Or, expressed fully as equation 22):

$$\Delta r = 1000 sw(S_x, L_y) - \left( T(S_x) \times \operatorname{int}\left( \frac{1000 sw(S_x, L_y)}{T(S_x)} \right) \right) \qquad 26)$$

Where $$\operatorname{int}\left( \frac{1000 sw(S_x, L_y)}{T(S_x)} \right)$$

is the largest integer less than or equal to $$\left( \frac{1000 sw(S_x, L_y)}{T(S_x)} \right).$$

In the above equations, the 1000 multiplication factor applies where time is desired in milliseconds (ms), weight in MB and $T(S_x)$ is specified in MB/s.

The method proceeds to step 466.

Step 466: Set New Deadline?

Step 462 above relates to determination of the delay relating to a particular value of slack weight. In practice, the delay cannot exceed a particular specified maximum. In the above embodiment, the maximum value of the slack time credit is 100 ms. However, it is to be understood that other values could be used as appropriate.

Essentially, the maximum value of the delay determines how many requests can be serviced before a deadline is set in a later step. Therefore, an unbounded value of delay will lead to excessive consumption of bandwidth by a particular service queue.

Additionally and/or alternatively, the slack weight remainder may be used to avoid rounding off errors. Therefore, the request scheduler 104 is operable to determine both the value of the delay and the slack weight remainder $\Delta r$ in prior steps 462 and 464.

Next, at step 466, it is determined whether a) the delay exceeds the maximum permissible value or b) the delay is greater than a minimum allowable time and the remainder $\Delta r$ is zero. The minimum allowable time in this embodiment is 10 ms which corresponds to the Linux kernel timer granularity of approximately 8-12 ms.

If either of the above conditions is satisfied, the method proceeds to step 468 and a new deadline is set. If neither condition a) nor condition b) is satisfied, then the method proceeds back to step 458 and a further request is serviced and the slack weight incremented as appropriate. No new deadline is set at this stage until either of criterion a) or b) is met and the method proceeds to step 468.

Step 468: Set New Deadline for Serviced Queue

At step 468, a new deadline is set by which time the next request $R_n(S_x, L_y)$ in the FIFO queue is to be serviced. The new deadline $d_n(S_x, L_y)$ to be set is dependent upon the nature of the system and the required throughput.

The deadline setting mechanism is described in detail in step 422. However, in this embodiment, the deadline setting mechanism is used to set a deadline after serving a number of requests as set out in equation 27).

$$d_n(S_x) = c.t. + \frac{sw(S_x, L_y)}{T(S_x)} \qquad 27)$$

In other words, equation 23) corresponds to equation 5) except the accumulated slack weight parameter is used instead of the weight of a single service request. In other words, instead of setting a deadline after serving a single request, the deadline is set after serving multiple requests, and a concomitantly later deadline will be set when compared to servicing an individual request.

Once the new deadline has been set, the method then proceeds back to step 402.

It will be appreciated that not all of the above variables are necessary in each case. For example, as set out in the case of a single service station arranged serve all requests in a distributed system, the distance parameter is not required. Since all service requests with weights are directed toward a single service station the service station itself can determine the distance if necessary.

Additionally, some service requests may come with zero weight meaning that the service station that receives this service request wastes no efforts to complete this service request.

In the above disclosure, the service rate, i.e., the rate at which a service station works to complete a service request is Weight/Time where Time is time taken to complete service request.

For a group of service requests, i.e., service requests with same service ID, service throughput corresponds to average service rate over all the service requests completed so far.

The above embodiments provide configurations where bandwidth can be guaranteed for throttled services in, in one example, a distributed environment. However, throttled services alone may not fully utilise the capacity of a service station. In order to compensate for this, the following embodiments provide for additional services to use any remaining capacity without compromising the bandwidth guarantees for the throttled services. The two additional services that may be provided comprise gracefully throttled services and unthrottled services.

Gracefully throttled services are services which have a guaranteed minimum bandwidth but which are not restricted to that minimum limit and may consume more bandwidth if the capacity is available to do so. If the service station has capability to do so after servicing all the throttled service requests, the service station may increase the service throughput for particular service IDs. Gracefully throttled services are identified by metadata received by the service station identifying particular service IDs as relating to a gracefully throttled service. This metadata may be sent as part of the service throughput metadata, or may comprise separate metadata.

Unthrottled services are services which have no minimum bandwidth requirements at all. The service station may accommodate these service requests if there is capability to do so. Unthrottled requests correspond to service IDs that have no associated service throughput requirements.

The scheduler gives first priority to throttled service requests thereby guaranteeing the service throughput of service IDs with throughput requirements. After this, the gracefully throttled and unthrottled service requests can be serviced using a number of fair scheduling mechanisms. An example of this may be a "round-robin" scheduling.

Figure 13:
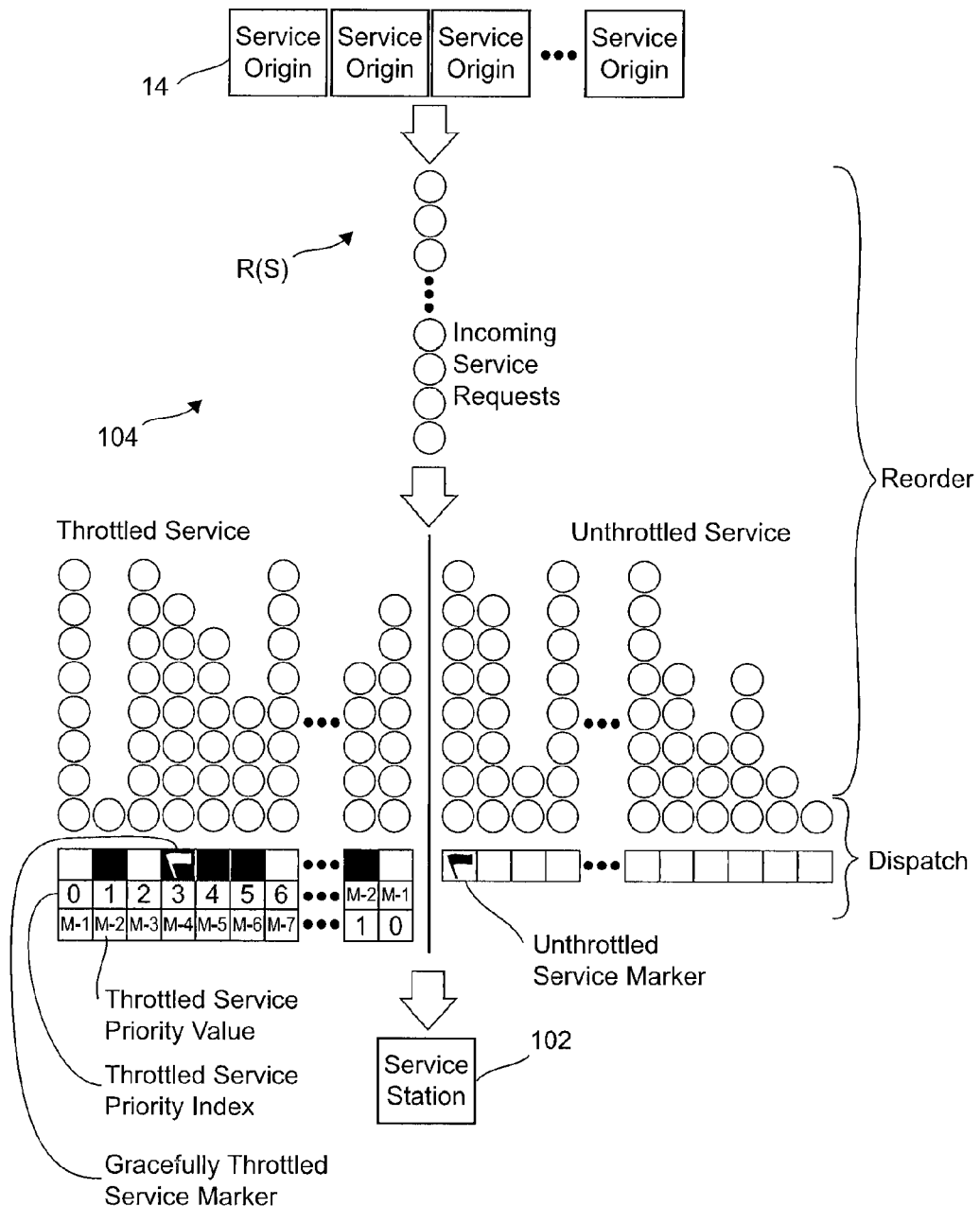
FIG. 13 is a schematic diagram showing the processing of service requests in the request scheduler according to an alternative embodiment.
Figure 14:
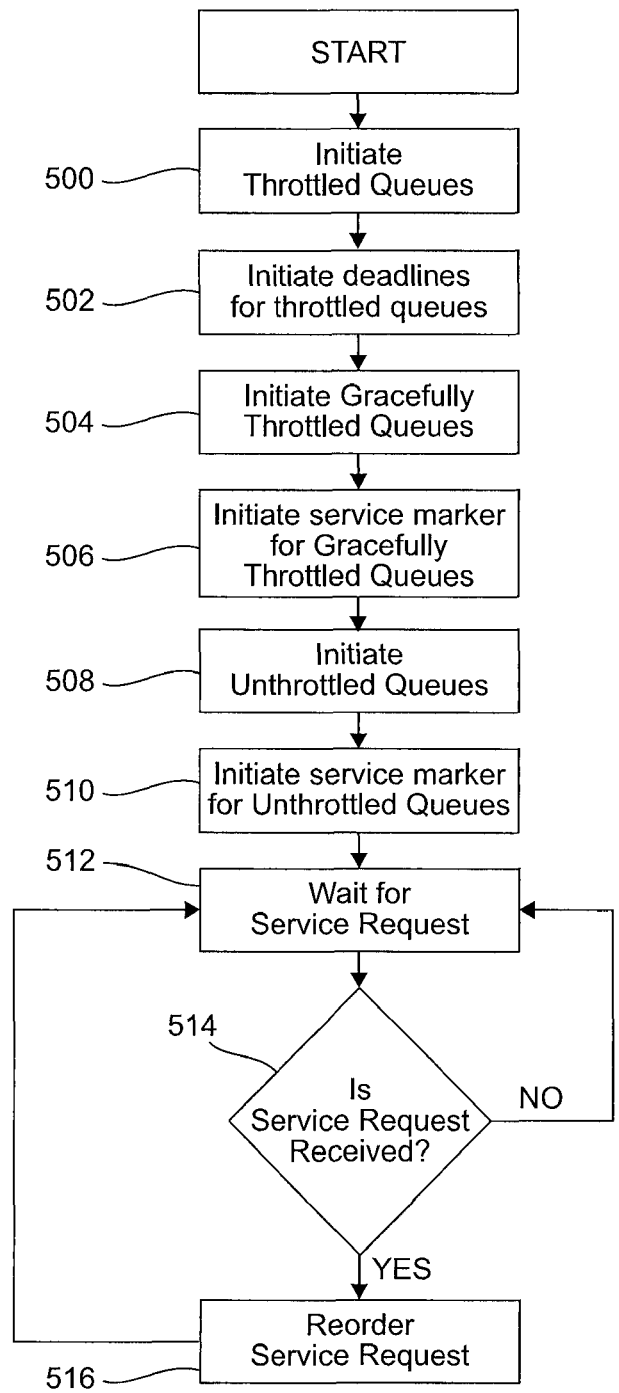
FIG. 14 is a flowchart illustrating the operation of the reordering process in the request scheduler according to an alternative embodiment.

FIG. 13 shows a schematic (similar to FIG. 6) showing the general process of operation. In this embodiment, the queues are divided into throttled services (shown in white) and unthrottled services (shown in grey). Gracefully throttled services are also shown in black in the throttled section. FIG. 14 shows a flow chart of the reordering process of this embodiment.

Step 500: Initiate Throttled Queues

At step 500, the request scheduler 104 configures a plurality of First-In First-Out (FIFO) queues for service.

Step 502: Initiate Deadlines for Throttled Queues

At step 502, an initial service deadline $d_n(S_x)$ is set. The service deadline $d_n(S_x)$ specifies the end of a time period within which request n in a queue of requests having service ID $S_x$ must be serviced in order to meet the service throughput requirements of the throttled queue for a particular service ID $S_x$. Initially, when requests are first received, they can effectively be served immediately. Therefore, the initial deadline is set to the current time.

Step 504: Initiate Gracefully Throttled Queues

At step 504, the request scheduler 104 configures a plurality of First-In First-Out (FIFO) gracefully throttled queues for service.

Step 506. Place Service Marker for Gracefully Throttled Queues

At step 506, a service marker (shown in FIG. 12) is placed next to the next gracefully throttled service queue in line for servicing. The gracefully throttled queue to which the service marker is placed may be selected on any appropriate basis; for example, by queue priority, by a round-robin system or by a random selection.

Step 508: Initiate Unthrottled Queues

At step 508, the request scheduler 104 configures a plurality of First-In First-Out (FIFO) queues for service as unthrottled queues.

Step 510: Place Service Marker for Unthrottled Queues

At step 510, a service marker is placed next to the first unthrottled service queue to demark the throttled and unthrottled service queues.

Step 512: Wait for Service Request

At step 512, the request scheduler 104 waits for a service request to be received from one of the services. The method then proceeds to step 514.

Step 514: Service Request Received?

At step 514, it is determined whether a service request has been received. If no service request has been received, the method proceeds back to step 512.

However, if a service request is received, the method then proceeds to step 516.

The request scheduler 104 receives the I/O requests $R_n(S_x)$, each of which includes the service ID $S_x$ and I/O size $w_n(S_x)$ and, optionally, may have service throughput metadata $T(S_x)$ associated therewith, from the service origin 14 via the network. The I/O requests $R_n(S_x)$ comprise metadata relating to a data payload from the service having service ID $S_x$.

Step 516: Reorder Incoming Requests by Service ID and Type

Once the requests $R_n(S_x, L_y)$ have been received, the request scheduler 104 reorders the requests into First-In First-Out (FIFO) queues for service. At step 518, the incoming requests $R_n(S_x, L_y)$ are sorted by service ID $S_x$ and allocated to an individual service so that each queue contains only requests $R_n(S_x, L_y)$ from the particular service having that service ID $S_x$.

As shown in FIG. 11, the requests $R_n(S_x)$ are ordered into throttled and unthrottled service queues. Requests $R_n(S_x)$ for the throttled queues are identified by the presence of service throughput metadata $T(S_x)$ relating to the specific service ID $S_x$ of the request $R_n$. The service throughput metadata $T(S_x)$ identifies that particular request $R_n(S_x)$ as coming from a client or service which has specified a particular minimum bandwidth requirement.

Requests $R_n(S_x)$ in the unthrottled queues are requests that will be addressed if sufficient capacity on the service station 102 exists to do this once the requests $R_n(S_x)$ in the throttled queues have been addressed. Unthrottled requests $R_n(S_x)$ do not have any service throughput metadata $T(S_x)$ associated therewith. The bandwidth remaining after the throttled service requests have been serviced will be shared between the unthrottled requests in the unthrottled request queues.

There is also a priority order to the throttled queues. As shown in FIG. 12, in a given service cycle the leftmost queue (having the highest priority) will be serviced first, followed by queues to the right. Finally, once the throttled queues have been served, the unthrottled queues will be served if sufficient bandwidth remains.

The priority order may be set in a number of ways. An arbitrary system would be for the first users to purchase or access the storage to be allocated the highest priority. Another scheme would be for users to purchase a particular priority.

The method then proceeds back to step 512 to process and reorder other incoming requests.

The method above operates continuously in the request scheduler 104 when in operation. Once the requests are organised into appropriate queues, then they can be dispatched to the respective service station 102 in the next stage of operation.

The dispatch process will be described with reference to FIGS. 15 to 19.

Figure 15:
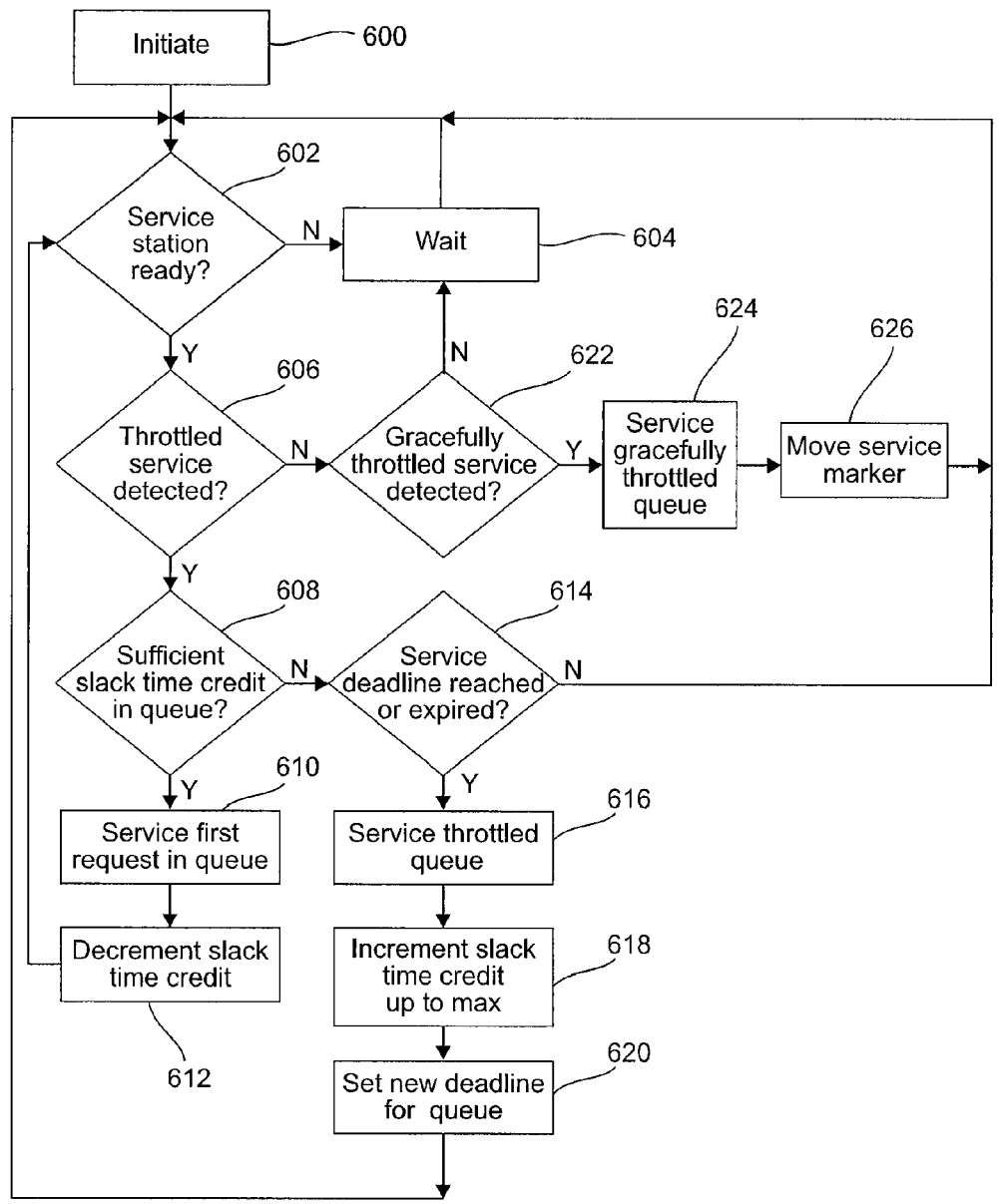
FIG. 15 is a flowchart illustrating the operation of the dispatch process in the request scheduler according to an alternative embodiment.

FIG. 15 shows an embodiment of the dispatch process involving throttled and gracefully throttled queues only. The steps of this method are set out below. Steps 600-620 are substantially similar to those of the steps 400-420 and procedures and subject matter in common will not be described again here. Only steps which are different will be described here.

Step 622: Gracefully Throttled Service Request Detected?

Step 622 is reached if, at step 606 it is determined that, in a stepwise scan of each of the throttled queues, none of the throttled queues has sufficient slack time credit to be serviced and none of the throttled queues has a service deadline which has been reached or is expired. The request scheduler 104 is then operable to move to the gracefully throttled queues.

The gracefully throttled queues are, essentially, of lower priority than the throttled queues and are provided to utilise (or "soak up") bandwidth that remains unused once the minimum bandwidth requirements have been met. In practical terms, a throttled connection will be, for example, a paid-for connection where a user pays for a particular amount of storage and a particular guaranteed bandwidth, and a gracefully throttled connection may be one where, at higher cost, extra bandwidth may be used when available.

Consequently, given their low priority, gracefully throttled queues are only serviced if there is currently no throttled queue which is at or has exceeded its respective deadline or which has sufficient slack time credit to be serviced.

If a gracefully throttled queue is not detected, the method proceeds back to step 604. However, if a gracefully throttled queue is detected, the gracefully throttled queue to which the service marker is associated is serviced in step 624.

Step 624: Service Gracefully Throttled Queue

The gracefully throttled queue to which the service marker is associated is serviced. When a gracefully throttled queue is serviced, the request scheduler 104 passes the respective request $R_n(S_x, L_y)$ at the head of that particular queue to the service station 102 for processing.

Step 626: Move Service Marker

Once the gracefully throttled request has been serviced in step 624, the service marker identifying the next gracefully throttled queue to be serviced is moved to the next gracefully throttled queue. Any suitable selection criterion may be used; for example, the next queue in priority order, a round-robin selection, a random queue selection or some other mechanism to select an arbitrary queue for processing.

The method then proceeds back to step 602.

It is to be appreciated that the above example of utilising gracefully throttled queues could also be applied to the embodiment of FIG. 12 whereby slack weight is used in place of slack time.

Figure 16:
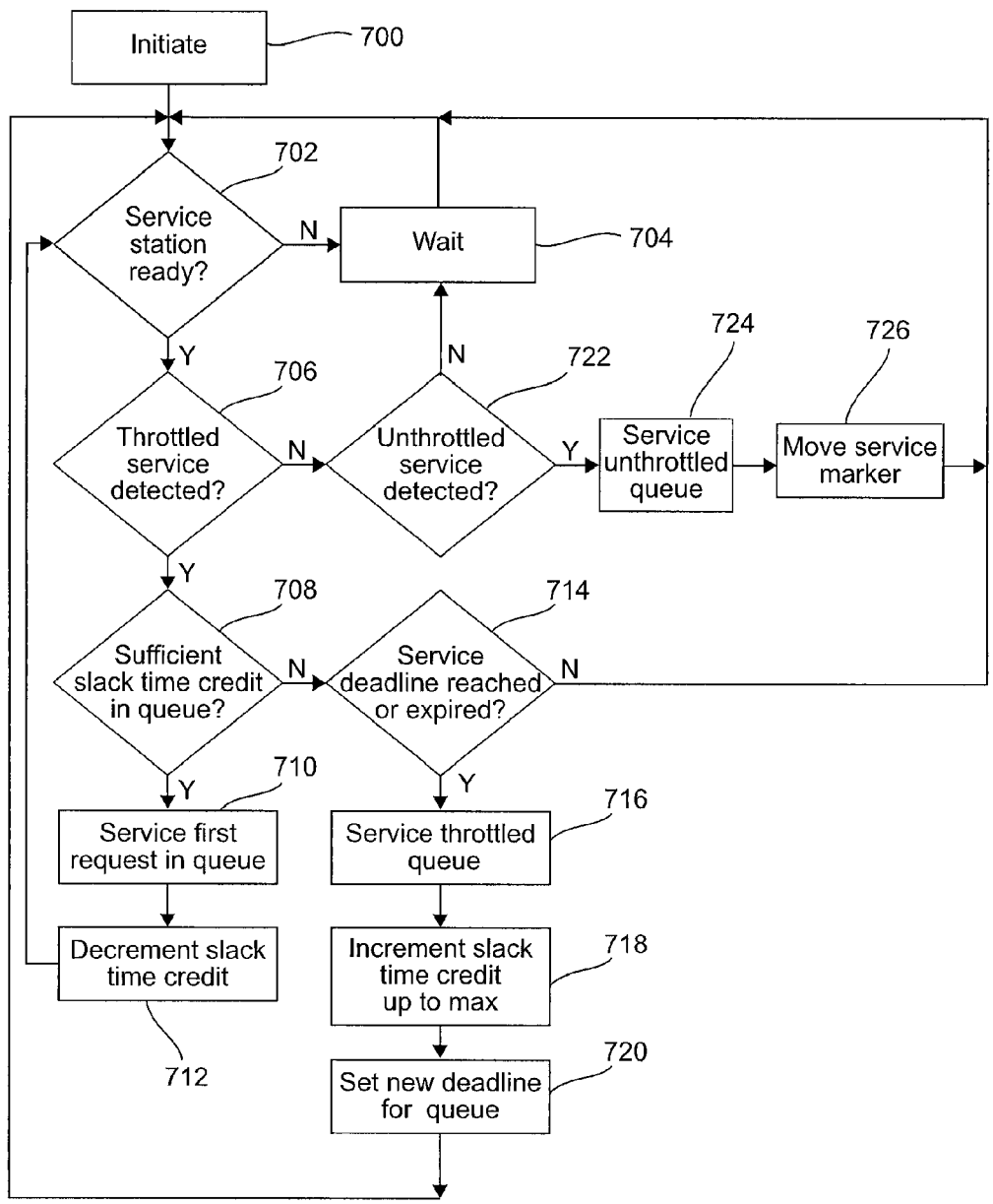
FIG. 16 is a flowchart illustrating the operation of the dispatch process in the request scheduler according to an alternative embodiment.

FIG. 16 illustrates an alternative embodiment whereby, instead of gracefully throttled connections, unthrottled connections are used. The steps of this method are set out below. Steps 700-720 are substantially similar to those of the steps 400-420 and procedures and subject matter in common will not be described again here. Only steps which are different will be described here.

Step 722: Unthrottled Service Request Detected?

Step 722 is reached if, at step 706 it is determined that, in a stepwise scan of each of the throttled queues, none of the throttled queues has a service deadline which has been reached or is expired, then the request scheduler 104 is operable to move to the unthrottled queues.

The unthrottled queues are, essentially, of lower priority than the throttled queues and are provided to utilise (or "soak up") bandwidth that remains unused once the minimum bandwidth requirements have been met for the throttled connections.

If an unthrottled queue is not detected, the method proceeds back to step 704. However, if an unthrottled queue is detected, the unthrottled queue to which the service flag is associated is serviced in step 724.

Step 724: Service Unthrottled Queue

In step 724, the unthrottled queue to which the service marker is associated is serviced starting. When the unthrottled queue is serviced, the Request scheduler 104 passes the respective request $R_n(S_x, L_y)$ at the head of that particular queue to the service station 102 for processing.

Unthrottled requests have no throughput requirements. However, unthrottled service requests need to be served fairly and any service of unthrottled requests should not affect the service throughput of throttled requests.

Step 726: Move Service Marker

The service marker is then moved to the next unthrottled queue in line. This applies until the Request scheduler 104 reaches the end of the unthrottled queues (i.e. the rightmost queue shown in FIG. 13), the service marker is returned to the first unthrottled queue in line.

The method then proceeds back to step 702.

Figure 17:
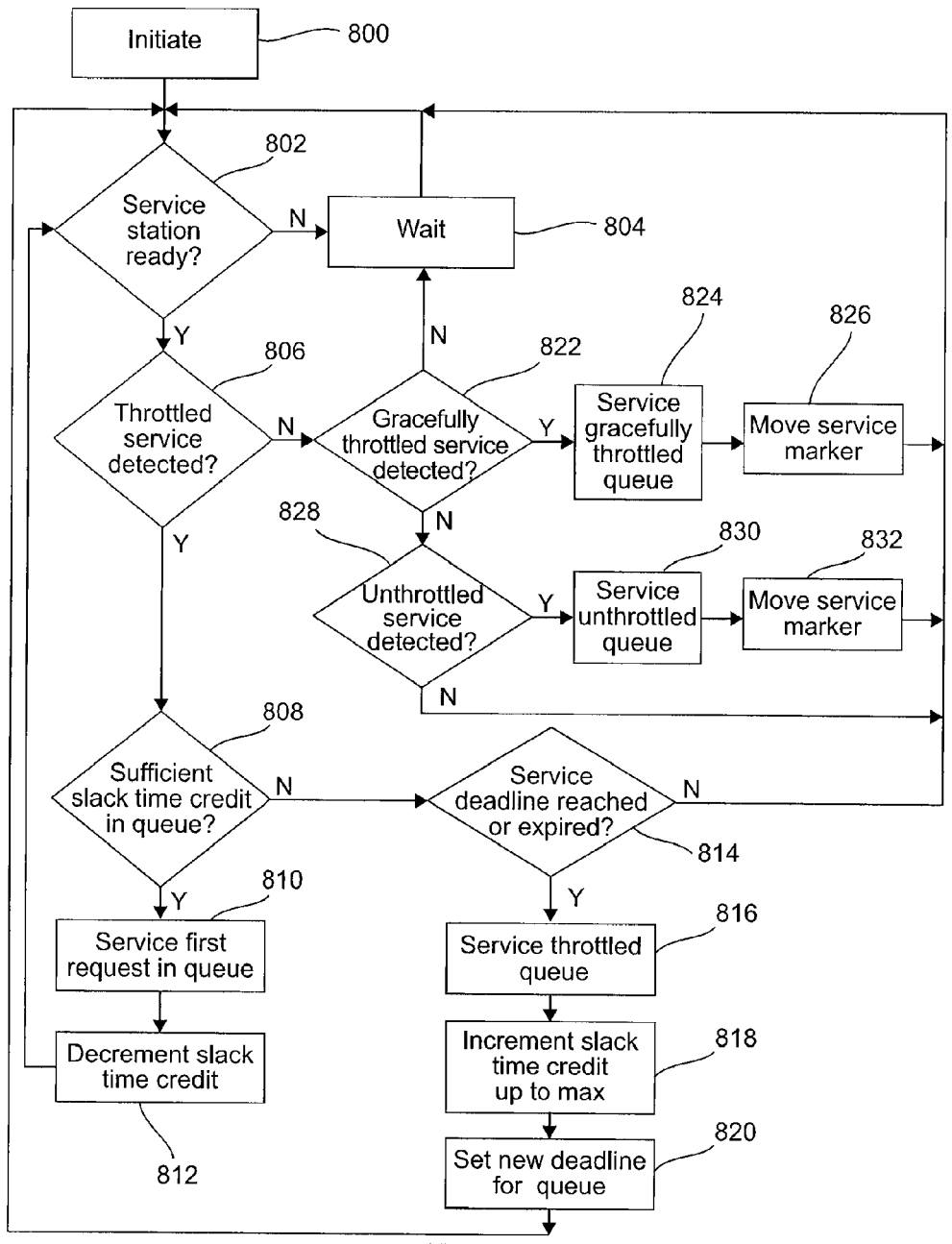
FIG. 17 is a flowchart illustrating the operation of the dispatch process in the request scheduler according to an alternative embodiment.
Figure 18:
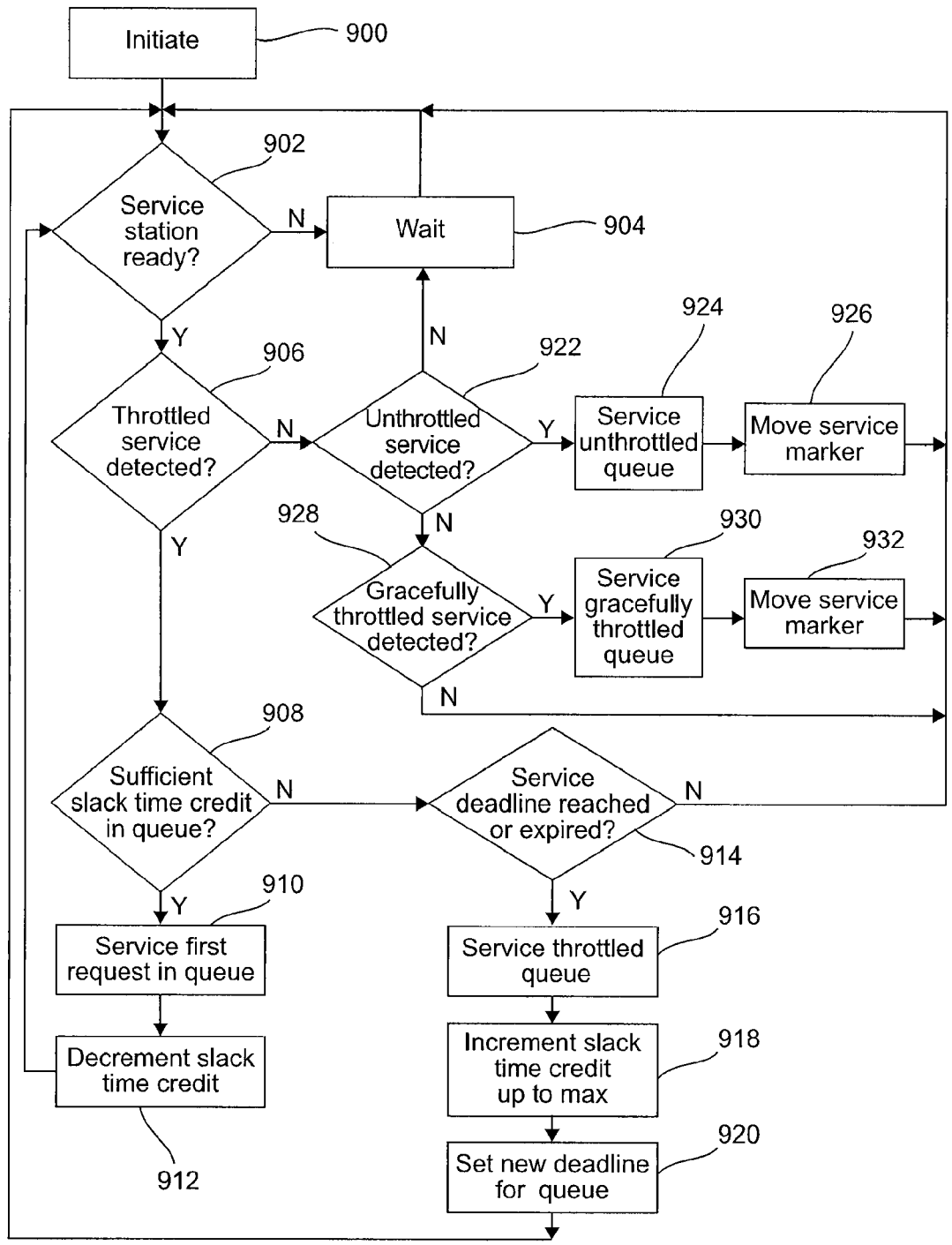
FIG. 18 is a flowchart illustrating the operation of the dispatch process in the request scheduler according to an alternative embodiment.

Two additional variations of the above method are illustrated in FIGS. 17 and 18. These illustrate the general approach shown in FIG. 13 whereby throttled connections are provided, together with gracefully throttled connections and unthrottled connections.

The gracefully throttled and unthrottled connections can be provided in any suitable priority order. It is envisaged that gracefully throttled services could take precedence over unthrottled service (as shown in FIG. 17) and vice versa (as shown in FIG. 18).

FIG. 17 illustrates a method whereby, if spare capability exists after throttled connections have been served, then gracefully throttled services are served followed by unthrottled services. The steps of this method are set out below. Steps 800-820 are substantially similar to those of the steps 400-420 and steps 824 and 826 are substantially similar to steps 724 and 726 and procedures and subject matter in common will not be described again here. Only steps which are different will be described here.

Step 822: Gracefully Throttled Service Request Detected?

Step 822 is reached if, at step 806 it is determined that, in a stepwise scan of each of the throttled queues, none of the throttled queues has a service deadline which has been reached or is expired, then the request scheduler 104 is operable to move to the gracefully throttled queues.

Given their low priority, gracefully throttled queues are only serviced if there is currently no throttled queue which is at or has exceeded its respective deadline. If a gracefully throttled queue is detected, the first gracefully throttled queue in priority order is serviced in step 824.

However, if a gracefully throttled queue is not detected, in this embodiment the method proceeds to step 828.

Step 828: Unthrottled Service Request Detected?

Step 828 is reached if, at step 822 it is determined that, in a stepwise scan of each of the gracefully throttled queues, none of these queues requires servicing. Then, in step 828, the request scheduler 104 is operable to move to the unthrottled queues.

If an unthrottled queue is detected, the first unthrottled queue in priority order is serviced in step 830. However, if an unthrottled queue is not detected, the method proceeds back to step 802.

Step 830: Service Unthrottled Queue

In step 830, the unthrottled queue to which the service marker is associated is serviced. When the unthrottled queue is serviced, the Request scheduler 104 passes the respective request $R_n(S_x, L_y)$ at the head of that particular queue to the service station 102 for processing.

Unthrottled requests have no throughput requirements. However, unthrottled service requests need to be served fairly and any service of unthrottled requests should not affect the service throughput of throttled requests.

Step 832: Move Service Marker

The service marker is then moved to the next unthrottled queue in line. This applies until the request scheduler 104 reaches the end of the unthrottled queues (i.e. the rightmost queue shown in FIG. 12), the service marker is returned to the first unthrottled queue in line.

The method then proceeds back to step 802.

Concomitantly, FIG. 18 illustrates a method whereby if spare capability exists after throttled connections have been served, then unthrottled services are served followed by gracefully throttled services. The steps of this method are set out below. Steps 900-920 are substantially similar to those of the steps 400-420 and procedures and subject matter in common will not be described again here. Only steps which are different will be described here.

Step 922: Unthrottled Service Request Detected?

Step 922 is reached if, at step 906 it is determined that, in a stepwise scan of each of the throttled queues, none of the throttled queues has a service deadline which has been reached or is expired, then the request scheduler 104 is operable to move to the unthrottled queues.

If an unthrottled queue is detected, the method proceeds to step 924 to service the queue. However, if no unthrottled request is detected, the method proceeds to step 928.

Step 928: Gracefully Throttled Service Request Detected?

Step 928 is reached if, at step 922 it is determined that, in a stepwise scan of each of the throttled queues, none of the throttled queues has a service deadline which has been reached or is expired, then the request scheduler 104 is operable to move to the gracefully throttled queues.

Given their low priority, gracefully throttled queues are only serviced if there is currently no throttled queue which is at or has exceeded its respective deadline and no unthrottled service request waiting.

If a gracefully throttled queue is detected at step 928, the first gracefully throttled queue in priority order is serviced in step 930. However, if a gracefully throttled queue is not detected, in this embodiment the method proceeds back to step 902.

Step 930: Service Gracefully Throttled Queue

The gracefully throttled queues are serviced starting with the queue having the highest priority M. When a gracefully throttled queue is serviced, the request scheduler 104 passes the respective request $R_n(S_x, L_y)$ at the head of that particular queue to the service station 102 for processing.

Step 932: Move Service Marker

Once the gracefully throttled request has been serviced in step 930, the service marker identifying the gracefully throttled queue to be serviced is moved to the next gracefully throttled queue in line.

The method then proceeds back to step 902.

Figure 19:
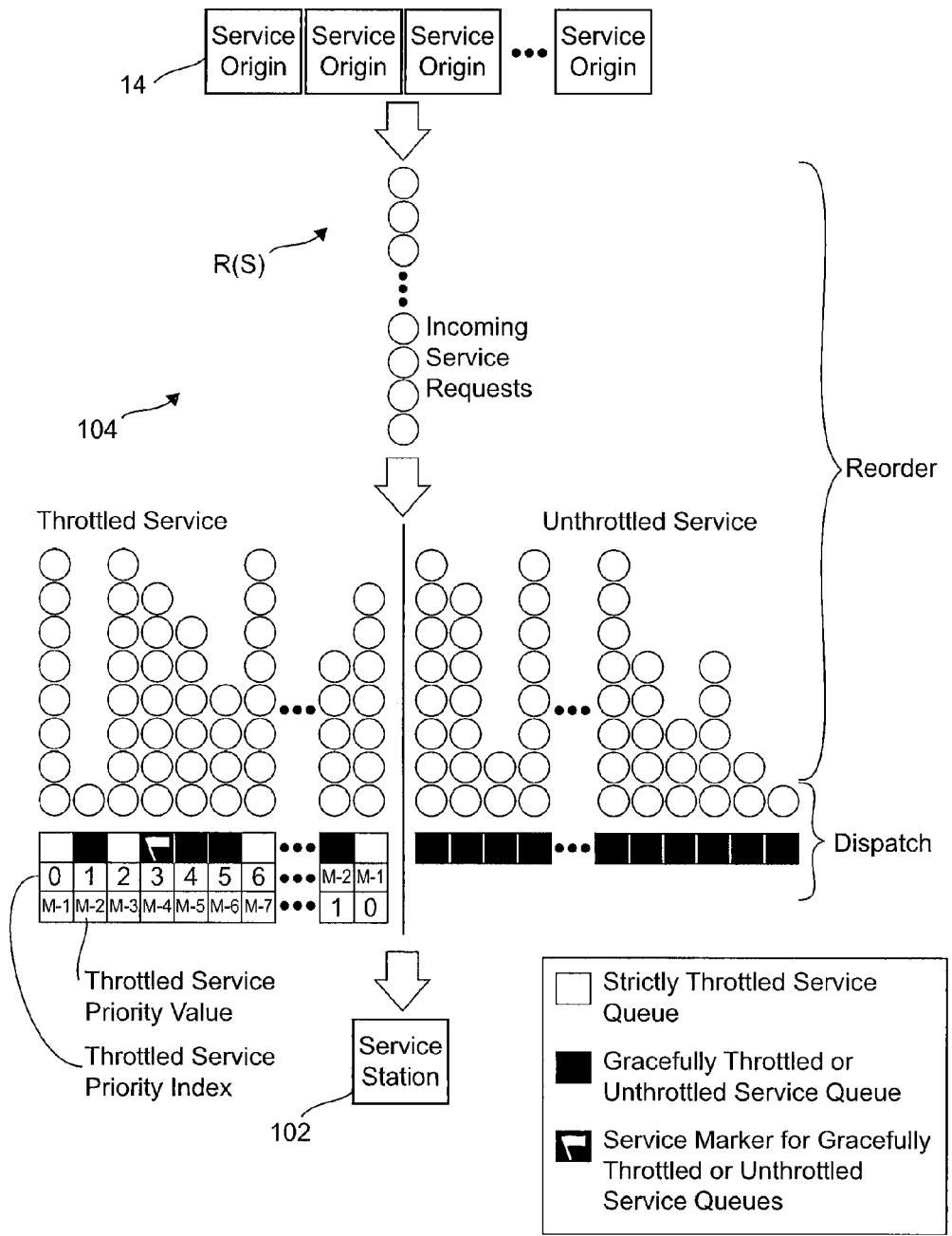
FIG. 19 is a schematic diagram showing the processing of service requests in the request scheduler according to an alternative embodiment.
Figure 20:
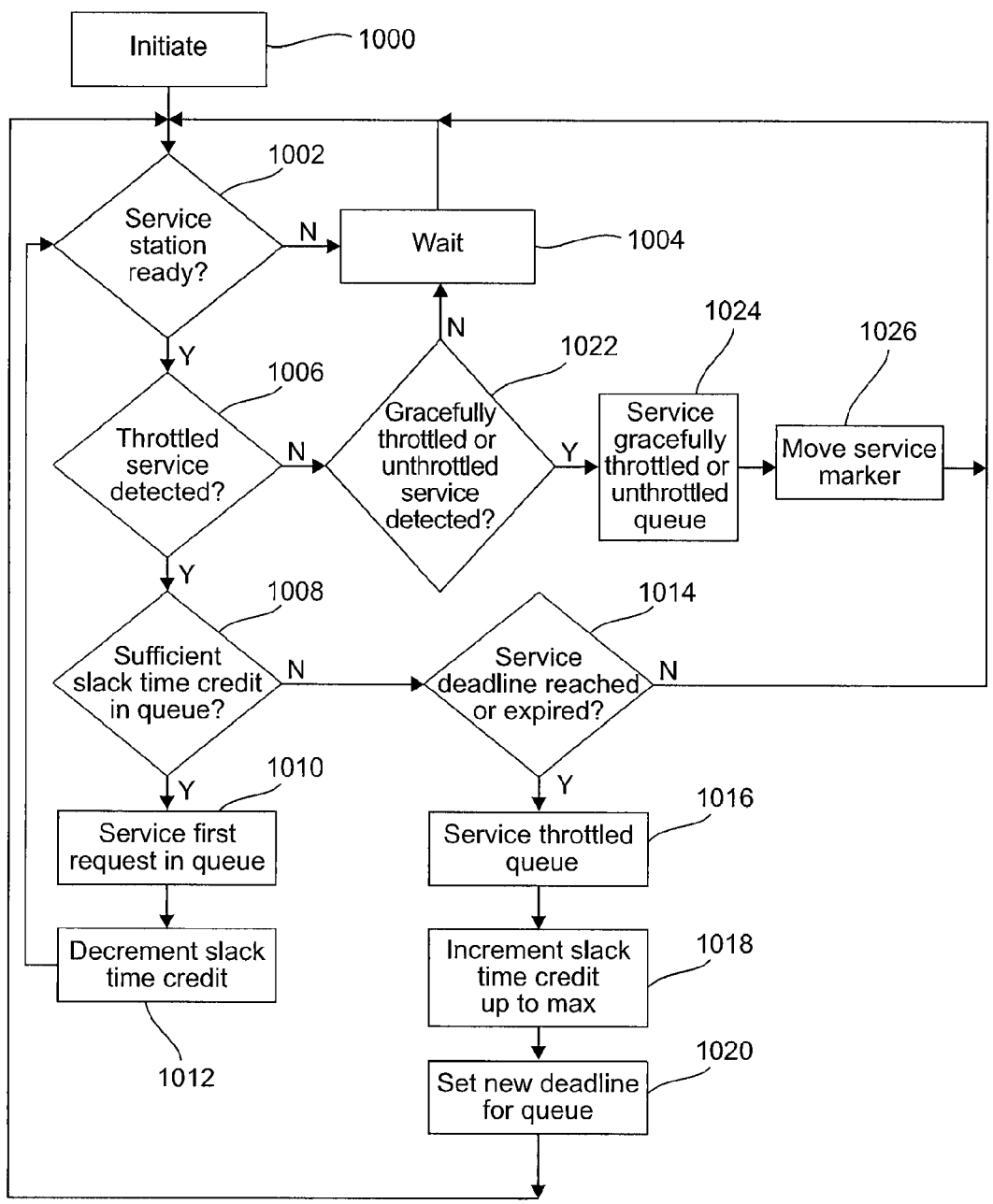
FIG. 20 is a flowchart illustrating the operation of the dispatch process in the request scheduler according to an alternative embodiment.

A final variation is shown in the embodiment of FIGS. 19 and 20. In this embodiment, instead of setting a priority order for the servicing of throttled and/or unthrottled queues, a single fair scheduling system is used to address both throttled and unthrottled queues equally. FIG. 19 shows a schematic diagram whereby throttled connections are provided, together with gracefully throttled connections and unthrottled connections. FIG. 20 shows a method according to an alternative embodiment of the invention.

The steps of this method are set out below. Some of steps 1000-1020 are substantially similar to those of the steps 400-420 as set out in FIG. 8 and procedures and subject matter in common will not be described again here. Only steps which are different will be described here.

In the method described below, gracefully throttled and unthrottled queues are treated equally without a preferred priority order. Therefore, a common service marker is shared between these queues and is moved as appropriate after a queue has been serviced.

Step 1022: Gracefully Throttled or Unthrottled Service Request Detected?

Step 1022 is reached if, at step 1006 it is determined that, in a stepwise scan of each of the throttled queues, none of the throttled queues has a service deadline which has been reached or is expired, then the request scheduler 104 is operable to move to the gracefully throttled queues and the unthrottled queues.

As previously described, the gracefully throttled queues and unthrottled queues are able to utilise bandwidth that remains unused once the minimum bandwidth requirements have been met for the throttled queues. Consequently, given their low priority, gracefully throttled queues and unthrottled are only serviced if there is currently no throttled queue which is at or has exceeded its respective deadline.

If neither a gracefully throttled queue nor an unthrottled is detected, the method proceeds back to step 1004. However, if a gracefully throttled queue or an unthrottled queue is detected, the gracefully throttled queue or unthrottled queue to which the service marker is associated is serviced in step 1014.

Step 1024: Service Gracefully Throttled Queue or Unthrottled Queue

The gracefully throttled queue or unthrottled queue to which the service marker is associated is serviced. When a gracefully throttled queue or an unthrottled queue is serviced, the request scheduler 104 passes the respective request $R_n(S_x, L_y)$ at the head of that particular queue to the service station 102 for processing.

The service marker in this example is common between both gracefully throttled queues and unthrottled queues. In other words, in contrast to previous embodiments that had a separate service marker for each queue type, in this arrangement, a single service marker is shared between both types of queue.

Step 1026: Move Service Marker

Once the gracefully throttled request or an unthrottled request has been serviced in step 1014, the service marker identifying the next gracefully throttled or unthrottled queue to be serviced is moved to the next gracefully throttled or unthrottled queue. Any suitable selection criterion may be used; for example, the adjacent queue, a round-robin selection, a random queue selection, an alternate gracefully throttled to unthrottled (or vice versa) selection or some other mechanism to select an arbitrary queue for processing.

The method then proceeds back to step 1002.

The method outlined above enable service throughput for a throttled service to be guaranteed. In other words, if the requests $R_n(S_x)$ are arriving at a higher rate than the specified bandwidth (or throughput) they need to be slowed down before being dispatched to the service station 102 by the Request scheduler 104. On the other hand, if the requests $R_n(S_x)$ are arriving slowly it is not necessary to slow them down. They can be dispatched to an available service station immediately.

In the above-described method, it is possible for the status of a service to change at any time. For example, a throttled service could become an unthrottled service or vice versa. This can be achieved by changing the service throughput metadata T associated with the request R as appropriate.

In this situation, a particular queue associated with a particular service ID S can be moved from the throttled queue section to the unthrottled queue section at any point based upon the updating of the service throughput metadata T(S) sent to the Request scheduler 104. The advantage of this arrangement is that a particular request $R_n(S_x)$ itself does not need to change format in order to move from one service type to another. This reduces the amount of processing and data exchange required.

The above scheduling method has a number of advantages. Throughput (i.e. bandwidth) is guaranteed for the throttled service when the system operates within its capacity. Further, when the system is operating within its capability, no throttled or unthrottled service can disrupt the throughput of other throttled or unthrottled services by send requests at a higher rate. This avoids a major drawback of conventional throttled service arrangements which can only impose a maximum possible bandwidth as opposed to a guaranteed minimum.

Furthermore, the described method enables unthrottled requests to be serviced by the service station 102 as well. The unthrottled requests are serviced only when there is no throttled service requests and therefore do not affect the throughput of the throttled services. Concomitantly, the ability to service unthrottled requests when system capacity permits enables improved utilisation of the service station 102.

Additionally, throughput is throttled for throttled service queues. Therefore, in this embodiment, for a given service ID $S_x$ the maximum throughput cannot be more than the associated service throughput $T(S_x)$ even when corresponding service requests $R_n(S_x)$ arrive at a higher rate.

The method outlined above enable service throughput for a throttled service to be guaranteed across multiple service stations receiving requests from a distributed service having multiple service locations. The above scheduling method has a number of advantages. Throughput (i.e. bandwidth) is guaranteed for the throttled service across a parallel file system when the system operates within its capacity. This bandwidth is guaranteed without each service station needing to share or communicate deadlines or other request processing information with other service stations. This eliminates a potentially enormous amount of data communication which would otherwise be required if, for example, a central server managed the data transactions and set the deadlines for each request to be processed.

Whilst the above embodiments have been illustrated as modifications of the embodiment of FIG. 8, it is to be understood that similar embodiments utilising the embodiments of FIGS. 11 and 12 could be used and fall within the scope of the present invention.

Figure 21:
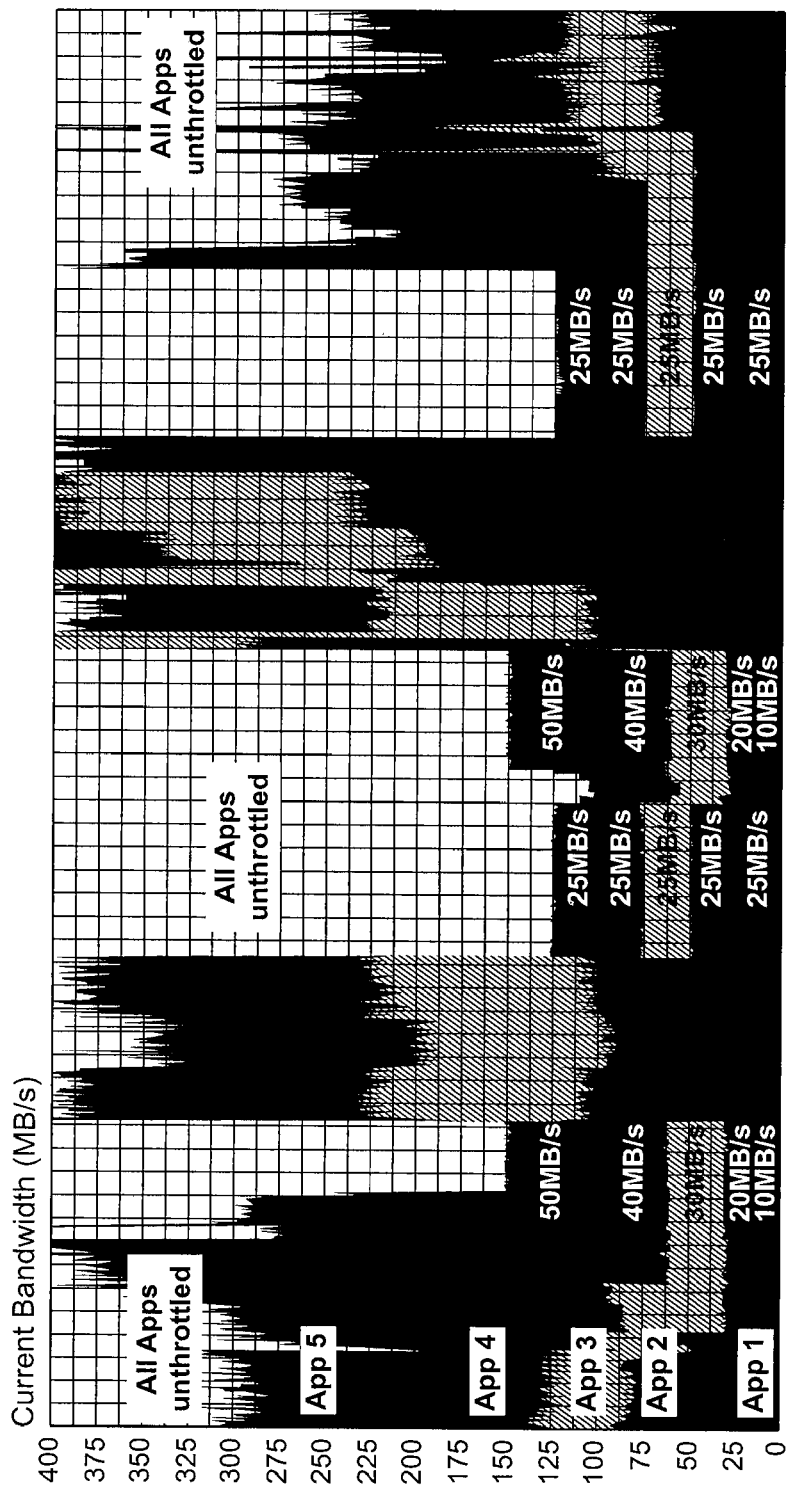
FIG. 21 is a schematic graph showing the operation of the present invention on a service station.

FIG. 21 is a graph of bandwidth usage on service stage connected to a typical storage network used by a plurality of applications. As shown, when all applications are unthrottled, close to the maximum capacity of the service station is used at times. However, when the method of the present invention is used, all applications are maintained at their specified minimum bandwidth, irrespective of the other connections. This figure illustrates the ability of the present invention to manage the bandwidth of multiple services.

Figure 22:
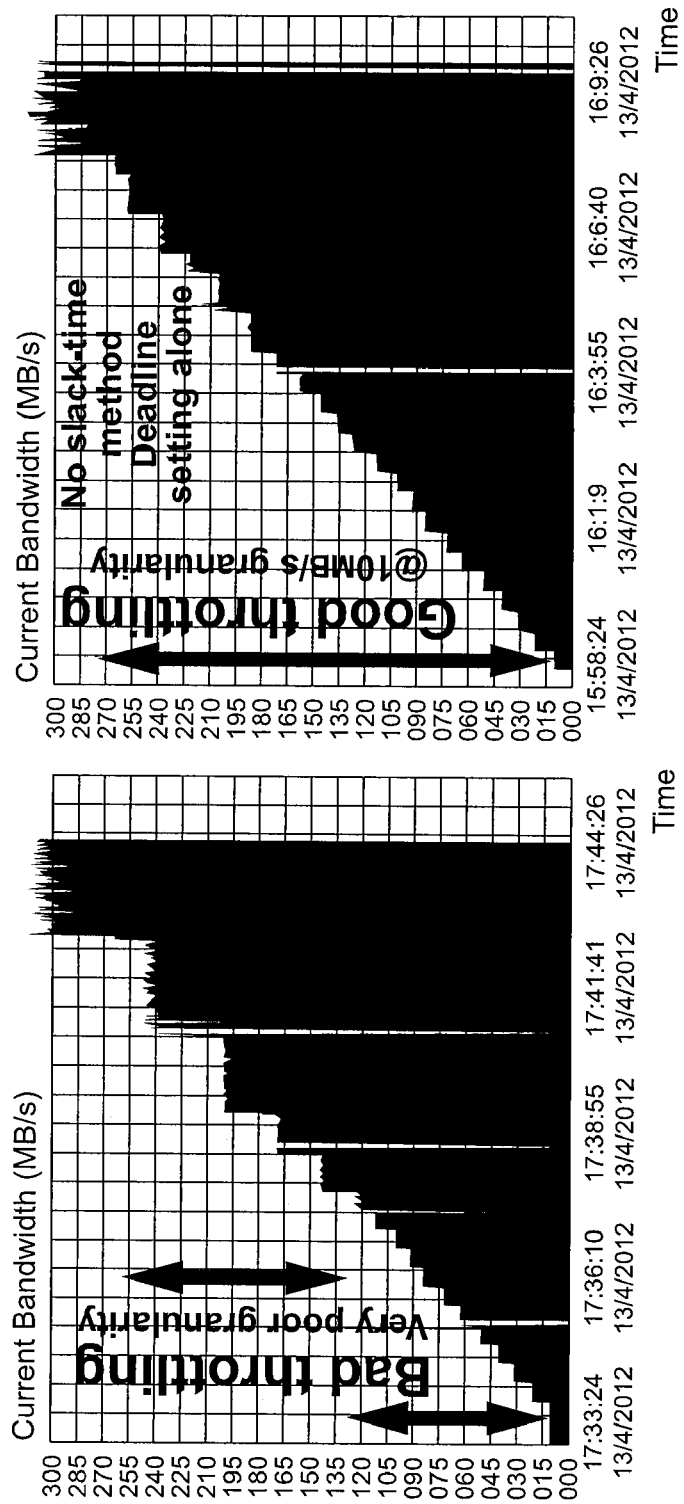
FIG. 22 is a schematic graph showing the advantageous operation of the present invention on a service station.

In addition, the present invention is capable of high granularity of throttling at high bandwidths. FIG. 22 illustrates a comparison of a method according to the second embodiment utilising slack weights (right hand figure). For comparison, the leftmost figure illustrates a similar method but without use of slack weights and with a more straightforward deadline setting mechanism.

Variations of the above embodiments will be apparent to the skilled person. The precise configuration of hardware and software components may differ and still fall within the scope of the present invention. For example, the location ID aspect of the third embodiment above could be equally applied to the single service station configuration of the first embodiment.

Whilst the distance and last served distance aspects above have been set out in terms of summing from 0 to n for the $n^{th}$ request, it is also possible to sum from 0 to n−1 and then add in the weight of the $n^{th}$ request, if desired.

Alternatively, if the requests are all of the same weight (i.e. I/O size), then the request number n or request count can be used to determine the distance (and, thus, the deadline) on the service station side.

Additionally, the distance parameter may be sent in a different format. For example, the distance, $x_n$, could be sent as a function which is then processed by the service station. Examples of such functions may be $a \cdot x_n$ where a is a constant or other function. Alternatively, function such as $(x_n)^2$ or $(x_n)^3$ may be used.

A more general approach may be to provide a general function, such as, for example, F, where F is an invertible function that has inverse G. Then, the request may comprise $F(x_n(R_n))$ from the client or service origin side to obtain $x_n(R_n)$ by inversion at the server/service station side because $x_n(R_n)=G(x_n(x_n(R_n)))$. Indeed, the examples given above Xn(Rn) itself corresponds to function F(x)=x which has inverse G(x)=x. A similar function could be used for the example given above in the $x_n(R_n)$=n case where all requests have equal weight.

In general, the distance parameter provides information identifying how much I/O has been sent to other service stations before sending a request. As set out above, the distance parameter may be supplied with the request or may be calculated from the supplied request number n.

However, variations are possible. For example, the service throughput T may, optionally, be supplied with the request rather than supplied by other means. Therefore, the request may optionally comprise the deadline data itself, i.e. the distance of the particular request divided by the throughput required for the service ID associated with the request. Alternatively, the deadline could be calculated on the service station side from the distance and the throughput data provided separately in the same request.

In addition, with regard to gracefully throttled services, the gracefully throttled identifier metadata may be supplied by the service coordinators to the service stations as described in the manner of the service throughput metadata T. The gracefully throttled identifier metadata may also be supplied as part of the service throughput metadata T. As a further variation, the gracefully throttled identifier may be included in the service request if desired.

In general, a number of permutations for determining deadlines may be used. For example, as set out above, a request may comprise only a request number, and the distance is calculated based on constant weights at the service station and the deadline determined from the throughput data received separately. Alternatively, the request may comprise a distance metric, with the throughput data being received separately by the service station and the distance/deadline determined at the service station.

Further, the request may comprise distance data determined at the service origin or client side and throughput data received separately by the service station. Finally, the request may comprise both distance data and throughput data either separately or in the form of deadline data sent to the service station. The final arrangement does not require the service station to perform any determination or calculations to determine the deadline. This may be beneficial in some configurations.

In the examples illustrated above, each service station may, for example, comprise an object storage server (OSS) that stores file data on one or more object storage targets (OSTs). Typically, an OSS serves between two and eight OSTs, with each OST managing a single local disk filesystem (not shown). The capacity of the file system is the sum of the capacities provided by the OSTs 8.

The service stations may, optionally, be connected to a metadata server (MDS). The MDS 3 has a single metadata target (MDT) per filesystem that stores metadata, such as filenames, directories, access permissions, and file layout. The MDT data is stored in a single local disk filesystem MDS. The MDS is configured to function as a portal for a client computers or services to the parallel file system comprising the storage located on the plurality of service stations. This may take the form of, for example, a webpage or a portal whereby a user can request access to a data storage resource.

The present invention is particularly applicable to parallel distributed file systems. These systems are often used for large scale cluster computing and may comprise file systems such as Lustre™ or Collibri™. However, it will be appreciated that this need not be the case and that other distributed network systems may fall within the scope of the present invention.

Embodiments of the present invention have been described with particular reference to the examples illustrated. While specific examples are shown in the drawings and are herein described in detail, it should be understood, however, that the drawings and detailed description are not intended to limit the invention to the particular form disclosed. It will be appreciated that variations and modifications may be made to the examples described within the scope of the present invention.

The invention claimed is:

1. A method performed in a computer system comprising:
   receiving service requests from a plurality of services comprising metadata specifying a service ID and a service request size, at least one of the service IDs having a required service throughput associated therewith;
   arranging, the service requests into throttled queues based on the service ID;
   setting a deadline for processing the service requests in the throttled queue based upon the service request size and the required service throughput;
   providing a time credit value for each throttled queue comprising an accumulated time value of the time by which one or more deadlines for that queue has been missed;
   comparing the time credit value to a time required to service a next service request in that throttled queue;
   if the time credit in the throttled queue is sufficient, then processing the next service request in a data storage device, and decrementing the time credit value for the throttled queue by an amount equal to the time required to service the next service request, else monitoring the deadline for processing of the next service request in said throttled queue to see if the next service request in the throttled queue has reached or exceeded its deadline, processing the next service request in a data storage device, and incrementing the time credit value for the throttled queue by the amount equal to the time by which the deadline for servicing the next service request was missed.

2. A method according to claim 1, wherein the time credit value for the or each queue has a maximum allowable value.

3. A method according to claim 2, wherein said maximum allowable value is 100 ms.

4. A method according to claim 1, wherein the time required to service the next service request in the throttled queue is determined from the data size of the next service request and the required throughput for that queue.

5. A method according to claim 1, wherein the step of processing the next service request comprises:
   processing the request in the data storage device and determining the remainder for the time credit difference corresponding to an amount equal to the time required to service the next service request, and decrementing the time credit value for the throttled queue by an amount equal to the time required to service the next service request only if the remainder is equal to zero.

6. A method according to claim 5, wherein if the remainder is non-zero, returning to the step of comparing without decrementing the time credit value.

7. A method according to claim 6, wherein the step of processing involves determining the remainder for the time credit difference corresponding to an amount equal to the time required to service one or more requests, and decrementing the time credit value for said queue by an amount equal to the time required to service said requests only if said remainder is equal to zero.

8. A method according to claim 1, wherein if, in the step of monitoring, it is determined that the deadline for processing of a request in said throttled queue has not yet expired, the method further comprises the step of:
   moving to the next throttled queue in line and carrying out steps of comparing, processing, and/or monitoring as required for that queue.

9. A method according to claim 1, wherein each service request is arranged into a queue selected from the group of: throttled queue, gracefully throttled queue and unthrottled queue.

10. A method according to claim 9, wherein in the step of arranging, service requests having a service ID to which no service throughput metadata is associated, or service requests having no service ID, are arranged into at least one unthrottled queue.

11. A method according to claim 10, wherein if, in the step of monitoring, no request in a throttled queue has reached or exceeded a deadline, the method further comprises:
   monitoring said unthrottled queues and, if at least one request is present in an unthrottled queue:
   processing said unthrottled request in an unthrottled queue; and
   returning to the throttled queues and repeating step e).

12. A method according to claim 9, wherein the step of arranging, service requests having a service ID to which service throughput metadata and gracefully throttled identifier metadata is associated are arranged into at least one FIFO gracefully throttled queue.

13. A method according to claim 1, wherein said throttled queues are arranged in priority order, with the monitoring starting with the highest priority queue.

14. A method according to claim 1, wherein a plurality of data storage resources are provided and the step of setting further comprises setting and selecting the deadline for the nth request having a particular service ID in dependence upon the sum of the data sizes of the first to the nth requests having said particular service ID and the required service throughput associated with said particular service ID.

15. A method according to claim 14, wherein each request having a particular service ID has the same data size and said deadline for the nth request having a particular service ID is set in dependence upon the request number n and the known weight of each request.

16. A method according to claim 15, wherein each request from a particular service ID comprises a distance parameter x associated therewith relating to the sum of the data sizes of the first to the nth requests from said particular service ID.

17. A method according to claim 16, wherein the step of setting comprises setting, on a service station, a new deadline for a request based on the distance parameter x of said request and the service throughput metadata associated therewith.

18. A method according to claim 1, wherein at least one service is distributed across a plurality of locations such that each service ID is associated with a plurality of location IDs.

19. A method according to claim 18, wherein each service request comprises a service ID and a location ID.

20. A method according to claim 1, wherein a plurality of parallel data storage devices is provided.

21. The method according to claim 1, wherein after decrementing the time credit value the method returns to the comparing the time credit value step, and after incrementing the time credit value the method returns to the setting a deadline step.

22. An apparatus, comprising:
   a programmable processor configured to communicate via a network, the processor further configured to:
   receive, via the network, service requests from a plurality of services comprising metadata specifying a service ID and a service request size at least one of the service IDs having service throughput metadata specifying a required service throughput associated therewith;
   arrange said requests into throttled queues based on the service ID;
   set a deadline for processing of the service requests in a throttled queue based upon the service request size and the required service throughput;
   provide a time credit value for each throttled queue comprising an accumulated time value which one or more deadlines for that queue has been missed;
   compare the time credit value to a time required to service a next service request in that throttled queue;
   if the time credit in the throttled queue is sufficient, then process the next service request in a data storage device, to decrement the time credit value for the throttled queue by an amount equal to the time required to service the next service request;
   else monitor the deadline for processing of the next service request in the throttled queue; see if the next service request in the throttled queue has reached or exceeded its deadline, process the next service request in a data storage resource, and increment the time credit value for the throttled queue by an amount equal to the time by which the deadline for servicing the next service request was missed.

23. The apparatus according to claim 22, wherein after decrementing the time credit value the processor is operable to return to the comparing the time credit value, and after incrementing the time credit value the processor is operable to return to setting a deadline.

24. A non-transitory computer usable storage medium having a computer program product stored thereon executable by a programmable processing apparatus and comprising one or more software portions for performing the steps of claim 1.

* * * * *